United States Patent [19]
Kajitani et al.

[11] Patent Number: 5,927,459
[45] Date of Patent: *Jul. 27, 1999

[54] MODULAR CLUTCH

[75] Inventors: Koji Kajitani, Kyotanabe; Hiroshi Takeuchi, Higashiosaka; Yasunobu Fukatani, Hirakata; Hiroshi Teramae, Nara; Masaaki Asada, Ibaraki; Takeo Shimizu, Kyoto; Hiroyuki Matsubara, Neyagawa, all of Japan

[73] Assignee: Exedy Corporation, Neyagawa, Japan

[ * ] Notice: This patent is subject to a terminal disclaimer.

[21] Appl. No.: 08/862,507

[22] Filed: May 23, 1997

Related U.S. Application Data

[63] Continuation-in-part of application No. 08/796,896, Feb. 6, 1997, which is a continuation of application No. 08/546,395, Oct. 20, 1995, Pat. No. 5,645,150, which is a continuation of application No. 08/331,206, Oct. 28, 1994, abandoned, which is a continuation of application No. 08/035,116, Mar. 19, 1993, Pat. No. 5,392,888.

Foreign Application Priority Data

May 23, 1996 [JP] Japan ................................. 8-128152

[51] Int. Cl.⁶ .................................................. F16D 13/00
[52] U.S. Cl. .................................. 192/70.27; 192/107 C; 192/112
[58] Field of Search .............................. 192/112, 70.16, 192/70.17, 107 C, 70.27, 70.11, 212

[56] References Cited

U.S. PATENT DOCUMENTS

| | | |
|---|---|---|
| 4,556,133 | 12/1985 | Huber .................................. 192/70.16 |
| 4,944,712 | 7/1990 | Wörner et al. . |
| 5,143,190 | 9/1992 | Westendorf et al. . |
| 5,392,888 | 2/1995 | Kajitani et al. ...................... 192/70.16 |
| 5,480,016 | 1/1996 | Kurz et al. ........................... 192/70.16 |
| 5,562,541 | 10/1996 | Fukushima . |
| 5,645,150 | 7/1997 | Kajitani et al. ...................... 192/70.16 |
| 5,680,918 | 10/1997 | Reik et al. ....................... 192/70.17 X |
| 5,711,406 | 1/1998 | Lindner et al. ..................... 192/70.17 |

FOREIGN PATENT DOCUMENTS

| | | |
|---|---|---|
| 35 45 635 A1 | 6/1987 | Germany . |
| 37 43 801 A1 | 7/1989 | Germany . |
| 40 14 470 A1 | 11/1991 | Germany . |
| 43 36 178 A1 | 4/1994 | Germany . |
| 196 33 931 A1 | 3/1997 | Germany . |

*Primary Examiner*—Charles A Marmor
*Assistant Examiner*—Saúl Rodríguez
*Attorney, Agent, or Firm*—Shinjyu An Intellectual Property Firm

[57] ABSTRACT

A modular clutch includes a flywheel 2, a clutch cover assembly 3 and a clutch disk assembly 4, which form a single module that in one embodiment is installed directly onto the crankshaft of an engine, and in an alternate embodiment is attached to a flex plate. The modular clutch is configured to be installed and replaced as a unit. The clutch cover assembly 3 has a clutch cover 21, a pressure plate 22 and diaphragm spring 23. The clutch disk assembly 4 has a clutch engagement portion 31 made of a metallic sintered body.

38 Claims, 22 Drawing Sheets

Fig. 24

| | Lubricity μ | Absorption | Adhesiveness | Grain Diameter μm/ Specific Gravity | Self-cohesion | Heat Resistance | Other Factors | |
|---|---|---|---|---|---|---|---|---|
| Molybdenum Disulfide MoS₂ | 0.006~0.25 | O | ⊖ | 0.5~10/4.8 | small | below 350°C | Can be used under high load conditions | O |
| Graphite C | 0.05~0.30 | Δ | Δ | 3.0~250/2.3 | small | below 550°C | Below grain diameter 3.0 μm, abrasive wear occurs | O |
| Tungsten Disulfide WS₂ | 0.05~0.28 | O | O | fine powder/7.4 | small | below 450°C | In humid air, μ increases | O |
| Boron Nitride BN | 0.20 | X | X | fine powder/2.3 | small | below 900°C | | Δ |
| Graphite Fluoride (CF)n | 0.04~0.20 | Δ | Δ | fine powder/2.5 | small | below 400°C | | O |
| PTFE | 0.02~0.20 | X | X | 0.5~several μm/2.2 | cohesion tendancy | below 150°C | | X |

⊖ = Highly Desirable
O = Desirable
Δ = Acceptable
X = Undesirable

MODULAR CLUTCH

RELATED U.S. APPLICATION DATA

The following application is a continuation-in-part of U.S. patent application Ser. No. 08/796,896, filed Feb. 6, 1997, which is a continuation of Ser. No. 08/546,395, filed Oct. 20, 1995, now U.S. Pat. No. 5,645,150 which is a continuation of Ser. No. 08/331,206, filed Oct. 28, 1994, now abandoned, which is a continuation of Ser. No. 08/035,116, filed Mar. 19, 1993, now issued as U.S. Pat. No. 5,392,888.

BACKGROUND OF THE INVENTION

A. Field of the Invention

The present invention relates to a modular clutch mechanism, and in particular to a modular clutch mechanism in which a flywheel, a clutch cover assembly and a clutch disk assembly form a single module that is installed and replaced as a single unit on a crankshaft of an engine.

B. Description of the Background Art

A clutch device generally includes a flywheel fixed to a crank shaft of an engine, a clutch cover assembly fixed to the flywheel and a clutch disk assembly arranged between the flywheel and the clutch cover assembly. Typically, the flywheel, clutch disk assembly and the clutch cover assembly are separate elements, each being repairable and replaceable irrespective of the other elements.

In prior art clutch devices, the flywheel is bolted to the crankshaft of the engine. The clutch cover assembly is bolted to the flywheel and the clutch disk assembly is sandwiched between the flywheel and the clutch cover assembly. Replacement of any one element may be achieved by removing the bolts on the clutch cover assembly, removing the clutch cover assembly and the clutch disk assembly and replacing either as necessary. The flywheel may then also be serviced or replaced as necessary.

A problem with the above prior art configuration is that the components, the flywheel, clutch cover and clutch disk assemblies are generally expensive to manufacture and are sometimes costly to service. Typically, both the clutch cover and clutch disk assemblies are replaced together even if only one of the two components is worn or damaged. As well, the flywheel is typically resurfaced upon replacement of the clutch disk and clutch cover assemblies. Therefore, all three components are renewed even if only one of the components is worn or damaged.

Recently, modular clutches have been introduced where the flywheel, clutch cover assembly and clutch disk assembly are assembled in advance to form a single module. Such a modular clutch is fixed to the crank shaft of the engine as a single unit. For example, a flexible plate is fixed in advance to the end of the crankshaft of the engine. An outer peripheral portion of the flexible plate is bolted to an outer peripheral portion of the flywheel. In this case, bolts are inserted from the engine side.

In the conventional modular clutch described above, the clutch cover and the flywheel are fixed together by welding, or the like without using bolts. Elimination of bolts allows reduction in weight and cost. In this semi-permanently fixing manner using caulking, welding or the like, the modular clutch must be entirely exchanged when a friction facing of the clutch disk assembly is worn to the limit. In the prior art modular clutch it is possible that the clutch disk assembly may become worn to its limit while the flywheel and clutch cover assembly are still usable. It is not possible to replace the clutch disk assembly easily using the modular construction described above. Therefore it is desirable to insure that the clutch disk assembly has as long a usable life as possible.

SUMMARY OF THE INVENTION

An object of the invention is to provide a modular clutch in which a clutch cover and a flywheel can be fixed together by a simple structure without any disadvantage.

Another object of the present invention is to prolong the life of a modular clutch.

In accordance with one aspect of the present invention, a modular clutch is configured as a single module for connection the output of an engine and includes a flywheel formed with a friction surface on one side and configured to be removably attached a torque output member of an engine. A clutch cover assembly includes a clutch cover that is fixed to the flywheel, a pressure plate being disposed inside the clutch cover, the pressure plate having a pressing surface facing the friction surface. The clutch cover assembly further includes a biasing member supported in the clutch cover for biasing the pressure plate against the flywheel. A clutch disk assembly is disposed between the friction surface and the pressing surface, the clutch disk assembly having a plurality of friction facings disposed between the friction surface and the pressing surface, the friction facing being formed of a metallic friction material.

Preferably, the clutch cover is caulked to the flywheel.

Preferably, the clutch cover is welded to the flywheel.

Preferably, the clutch cover is riveted to the flywheel.

Preferably, the modular clutch further includes a ring gear disposed about the clutch cover and the clutch cover encompasses an outer periphery of the flywheel, the ring gear being shrink-fitted about the clutch cover such that the ring gear causes the clutch cover to firmly engage the outer periphery of the flywheel.

Preferably, the flywheel includes a first flywheel and an inertia member, and a torsional vibration damper mechanism is disposed between the first flywheel and the inertia member, the torsional vibration damper mechanism allowing limited relative rotation between the first flywheel and the inertia member and further damping vibration therebetween.

Preferably, the torsional vibration damper mechanism is formed with a chamber having an elastic member disposed therein, and a powder solid lubricant is further disposed within the chamber.

Preferably, the elastic member is a bent, undulated plate spring.

Preferably, an outer peripheral portion of the bent plate spring contacts an peripheral wall of the accommodating chamber thereby defining a friction generating mechanism which generates friction therebetween in response to relative rotation between the first flywheel and the inertia member.

Preferably, the powder solid lubricant is made of molybdenum disulfide.

Preferably, the powder solid lubricant is made of tungsten disulfide.

Preferably, the clutch disk assembly further includes a cushioning member capable of elastically deformation in an axial direction, and the friction facings are fixed to opposite surfaces of the cushioning member, respectively.

Preferably, the first flywheel and the pressure plate are made of cast iron containing Cr, v and a rare earth element added thereto.

In accordance with another aspect of the present invention, a modular clutch construction includes a flywheel having an end face configured for connection to a crankshaft of an engine, the end face also having a circumferentially peripheral bulge protruding axially, the axial protrusion increases along a direction of increasing flywheel radius. A clutch cover assembly includes a clutch cover encompassing the flywheel and axially positioning relative to the flywheel, the clutch cover having a bent rim inwardly bent so as to clamp the peripheral bulge being provided with retaining elements fixed to the input end face, the clutch cover being dish-shaped and having a peripheral wall axially extending over the clutch disc assembly, the input end face having a plurality of circumferentially spaced pedestal portions corresponding to the retaining elements, the retaining elements being formed along the bent rim, each of the retaining elements being bent radially inward flush with a surface of the pedestal portions, the clutch cover assembly further including a pressure plate coaxial with the flywheel and facing an opposite end face of the flywheel. A clutch disk assembly is coaxially disposed with respect to the pressure plate and the flywheel and is disposed therebetween, riction portions of the clutch disk assembly are formed of a sintered metal material. Fasteners fix the clutch cover retaining elements to the pedestal portions. A portion of the clutch cover peripheral wall is stepped radially inward, forming an abutment which abuts marginally against the opposite end face of the flywheel.

Preferably, the flywheel and the pressure plate are made of cast iron containing Cr, V and a rare earth element added thereto.

In accordance with yet another aspect of the present invention, a modular clutch construction includes a flywheel having an annular portion formed with an outer radial surface, a first axial face is connectable to a corresponding member of an engine for power input to the clutch, the first axial face having a peripheral bulge extending axially, and a second axial face opposite the first axial face. A clutch cover assembly has:

(a) an annular pressure plate having an outer radial surface, coaxially disposed adjacent to the flywheel and facing the second axial face;

(b) an urging member attached to the pressure plate for elastically urging the pressure plate toward the flywheel;

(c) a unitary clutch cover including an annular wall encompassing the outer radial surfaces of the pressure plate and the flywheel, a caulking portion extending from the annular wall to be caulked to the peripheral bulge, a fixation portion extending from the annular wall to be fixed to the second axial face, and a support portion for supporting the urging member.

A clutch disc assembly coaxially is disposed between the pressure plate and the flywheel, friction portions of the clutch disk assembly being formed of a sintered metal material.

Preferably, the flywheel and the annular pressure plate are made of cast iron containing Cr, V and a rare earth element added thereto.

Preferably, the peripheral bulge has an arcuate shape, and the caulking portion has an arcuate shape corresponding to the peripheral bulge.

Preferably, the peripheral bulge extends outwardly in an axial direction adjacent to a peripheral edge of the Preferably, the annular wall has a second caulking portion caulked to a peripheral edge of the second axial face of the flywheel, the flywheel being axially sandwiched b Preferably, the second caulking portion of the clutch cover is stepped radially inward and abuts against the second Preferably, the annular wall has a second caulking portion caulked to a peripheral edge of the second axial face of the flywheel, the flywheel being axially sandwiched between the caulking portion and the second caulking portion.

Preferably, the second caulking portion of the clutch cover is stepped radially inward and abuts against the second Preferably, the peripheral bulge extends outwardly in an axial direction adjacent to an outer radial edge of the flywheel.

Preferably, the annular wall has a second caulking portion caulked to a peripheral edge of the second axial face of the flywheel, the flywheel being axially sandwiched between the caulking portion and the second caulking portion.

Preferably, the second caulking portion of the clutch cover is stepped radially inward and abuts against the second axial face of the flywheel.

Preferably, the annular wall has a second caulking portion caulked to a peripheral edge of the second axial face of the flywheel, the flywheel being axially sandwiched between the caulking portion and the second caulking portion.

Preferably, the second caulking portion of the clutch cover is stepped radially inward and abuts against the second end face of the flywheel.

In still another aspect of the present invention, a modular clutch construction includes a flywheel having an outer radial surface and an axial face and an annular pressure plate having an outer radial face, the annular pressure plate being coaxially disposed adjacent to the flywheel and facing the axial face of the flywheel. A clutch cover encompasses the outer radial surfaces of the pressure plate and the flywheel, a radial inner surface of the clutch cover contacting the outer radial surface of the flywheel at a contact position. A ring gear is fitted onto a peripheral surface of the clutch cover radially over the contact position, the ring gear being shrunk fitted on the peripheral surface of the clutch cover. A plurality of axially extending slits are formed circumferentially spaced on an interior margin of the clutch cover at the contact position. A clutch disc assembly coaxially disposed between the pressure plate and the flywheel, friction portions of the clutch disk assembly being formed of a sintered metal material.

Preferably, a positioning means maintains a fixed relative position between the clutch cover and the flywheel.

Preferably, the positioning means includes a plurality of holes formed in the clutch cover and the flywheel having pins inserted therein, the holes being spaced respectively about the circumference of the clutch cover and the flywheel in alignment with the contact position.

Preferably, the positioning means includes an abutment portion formed as a radially inward step on the clutch cover, the abutment portion abutting the axial face of the flywheel at a radially outward position.

Preferably, the modular clutch construction further includes a flexible plate mountable to a second axial face of the flywheel.

Preferably, the flywheel and the annular pressure plate are made of cast iron containing Cr, V and a rare earth element added thereto.

The foregoing and other objects, features, aspects and advantages of the present invention will become more apparent from the following detailed description, when taken in conjunction with the accompanying drawings.

BRIEF DESCRIPTION OF THE DRAWINGS

FIG. 24 shows lubrication characteristics of various kinds of solid lubricants employable in the eighth and ninth embodiments of the present invention.

DESCRIPTION OF THE PREFERRED EMBODIMENTS

FIRST EMBODIMENT

Figure 1:
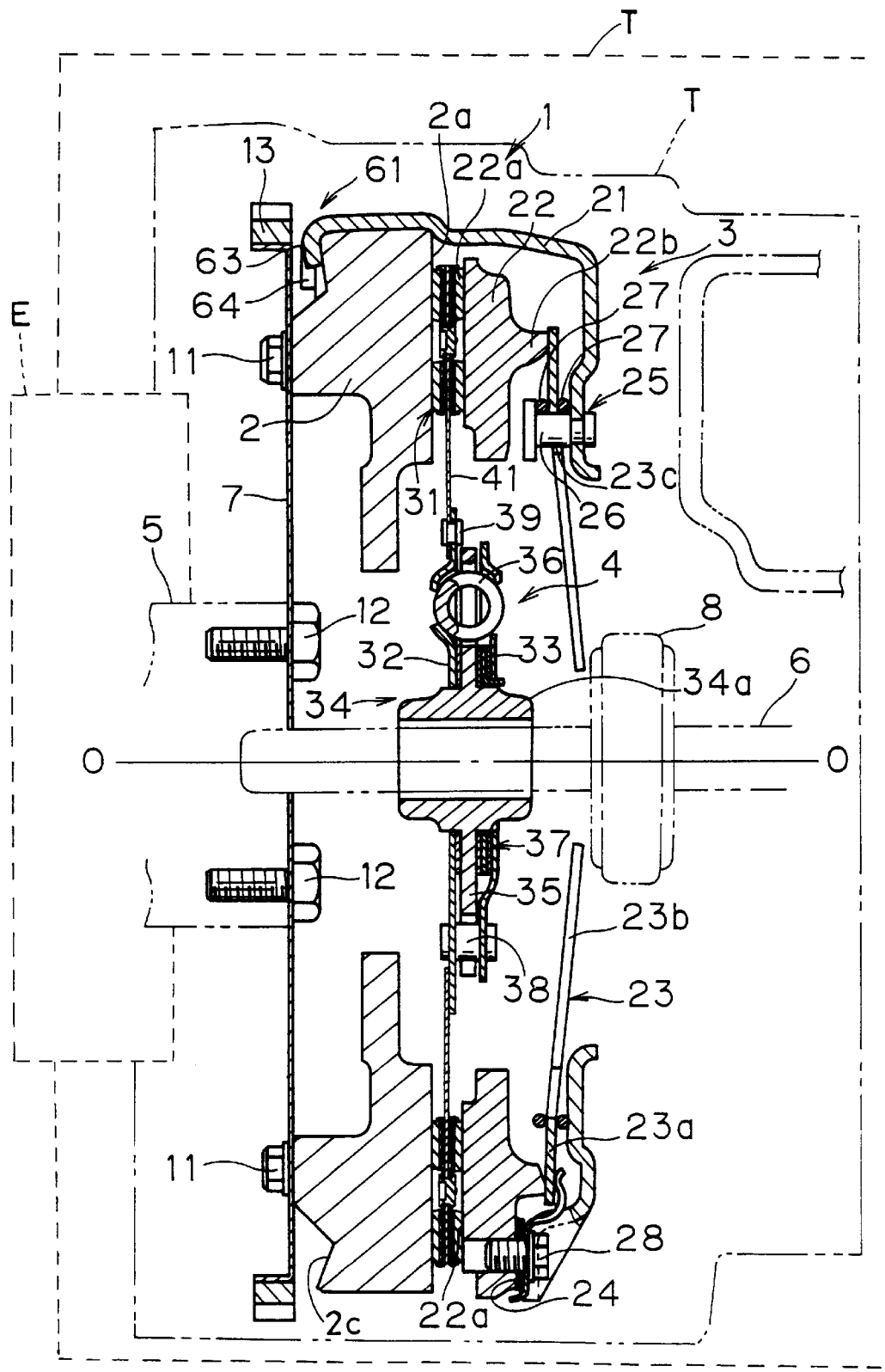
FIG. 1 is a schematic cross section view of a modular clutch in accordance with a first embodiment of the present invention, where the modular clutch is attached to a flexible plate mounted on a crankshaft of an engine.

A modular clutch 1 shown in FIG. 1 includes a flywheel 2, a clutch cover assembly 3 and a clutch disk assembly 4 which form a single modular assembly. An engine E is disposed at the left side of FIG. 1, and a transmission T is disposed at the right side of the figure. In FIG. 1, O—O represents a rotation axis of the modular clutch 1. Hereinafter, toward the left side of FIG. 1 will be referred to as the engine side and toward the right side of FIG. 1 will be referred to as the transmission side.

The modular clutch 1 is a device for transmitting and interrupting a torque from a crank shaft 5 of the engine to a main drive shaft 6 extending from the transmission. The modular clutch 1 is configured to be installed and removed from the engine E as a single unit. The modular clutch 1 is attached to a flexible plate 7 which is fixed to the end of the crank shaft 5 by a plurality of bolts 12. The flexible plate 7 has a high rigidity in the rotating direction but is flexible in the bending direction (axial directions). A ring gear 13 is fixed to the outer peripheral portion of the flexible plate 7, for instance, by welding. A flywheel 2, described below, of the modular clutch 1 is fixed to the outer peripheral portion of the flexible plate 7 by a plurality of bolts 11. The main drive shaft 6 has spline gear teeth that spline engage a hub 34 of the clutch disk assembly 4 and is described below. A release device 8 is axially movably arranged around the main drive shaft 6. The release device 8 can engage with a transmission side of a diaphragm spring 23, described below, of the clutch cover assembly 3.

The flywheel 2 has a substantially annular shape, and has a flat friction surface 2a faced toward the transmission. The flywheel 2 is made of, for instance, cast iron containing Cr, V and a rare earth element.

Figure 2:
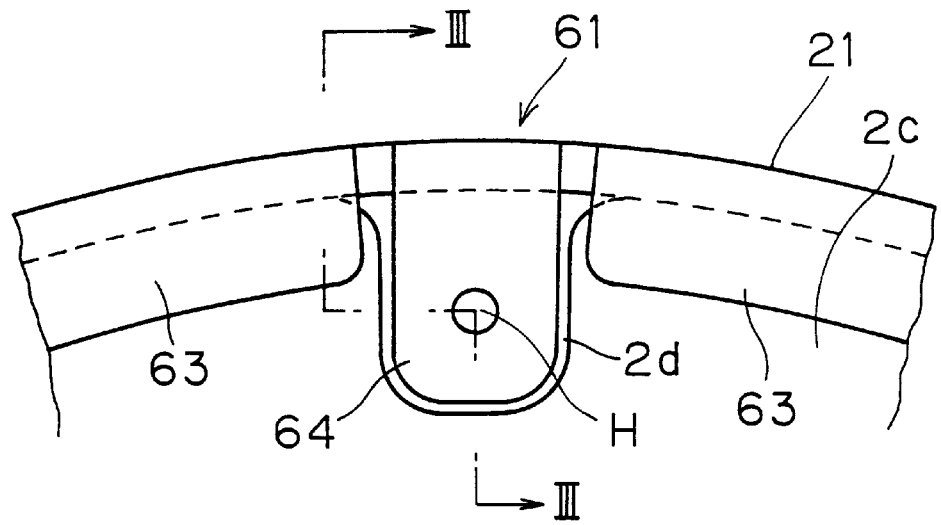
FIG. 2 is a fragmentary plan of a cover coupling portion of the modular clutch depicted in FIG. 1, with the modular clutch removed from the flexible plate.
Figure 3:
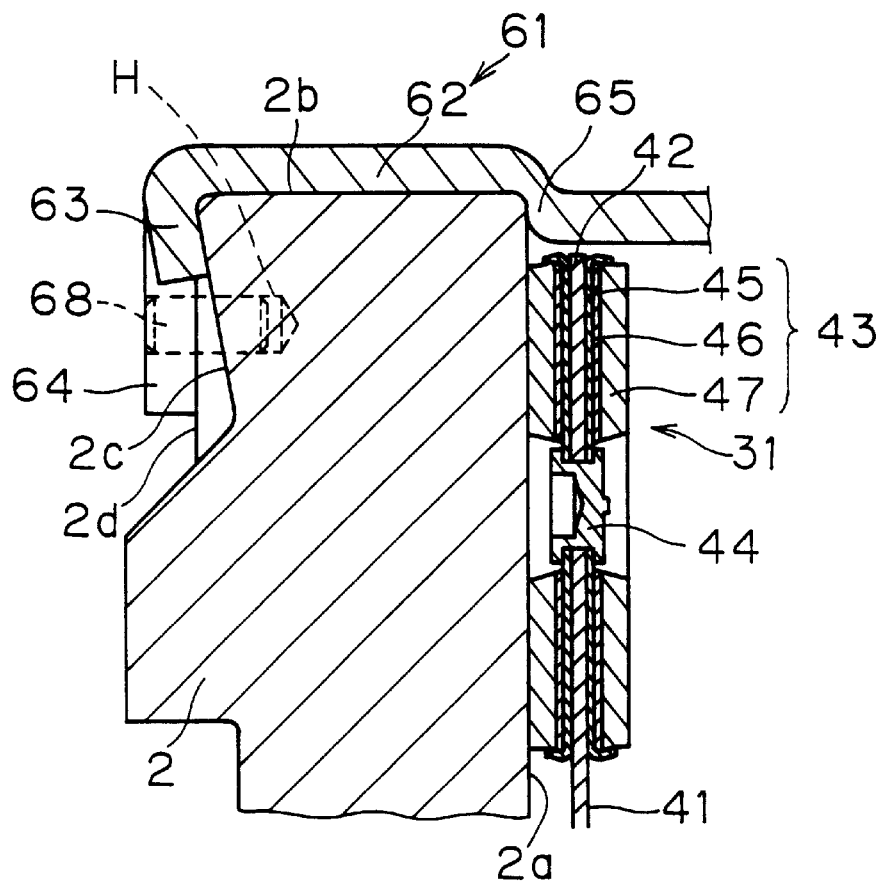
FIG. 3 is a fragmentary cross section view of a portion of the modular clutch depicted in FIG. 1, on an enlarged scale, showing further details of the cover coupling portion depicted in FIG. 2.

As shown in FIGS. 2 and 3, the flywheel 2 is provided with a plurality of inclined grooves 2c extending in the circumferential direction on an outer peripheral side surface thereof, facing the engine side. Each inclined groove 2c has an inclined bottom which increases the depth as the position moves from the radially outer side toward the inner side of the flywheel 2. Flat portions 2d are formed between adjacent inclined grooves 2c. Each flat portion 2d has a hole H of a predetermined depth at its substantially center portion.

The clutch cover assembly 3 includes a clutch cover 21, a pressure plate 22 and a diaphragm spring 23. The clutch cover 21 has a dish-like plate shape. The clutch cover 21 has a large aperture at its center through which the shaft 6 extends. The outer peripheral wall of the clutch cover 21 extends axially, and has an end fixed to the outer peripheral portion of the flywheel 2.

Description will now be given on a cover fixing unit 61 which serves to fix the flywheel 2 and the clutch cover 21 to one another. The clutch cover 21 is provided at its axial end with an outer cover portion 62, which wraps about portions of the outer peripheral surface 2b of the flywheel 2 and is in direct contact therewith. The end of the outer cover portion 62 is provided at its end with a plurality of caulking portion 63 which correspond in circumferential length to the inclined groove 2c. The outer cover portion 62 is also provided with a fixing portion 64 sized and shaped to generally correspond to the flat portion 2d, as is shown in FIG. 2. The caulking portion 63 is bent to conform and cover the inclined groove 2c on the flywheel 2, as shown in FIG. 3. The fixing portion 64 extends radially inward beyond the caulking portion 63, and is in close contact with the flat portion 2d of the flywheel 2. The fixing portion 64 is fixed to the flat portion 2d by a pin 68 which is inserted into the hole H. In this manner, relative rotation between the flywheel 2 and the clutch cover 21 is prevented. Further, the clutch cover 21 is provided at an outer peripheral portion with an annular contact portion 65 which is caulked to extend radially inwardly, and is in contact with the outer peripheral edge of the friction surface 2a of the flywheel 2 from the transmission side, as is shown in FIG. 3. The contact portion 65 has a recessed surface which is in contact with an outer radial portion of the friction surface 2a. When the clutch cover 21 is fitted to the outer periphery of the flywheel 2, this recessed surface is in contact with the friction surface 2a of the flywheel 2 so that the flywheel 2 is axially positioned with respect to the clutch cover 21.

The pressure plate 22 is an annular member disposed radially inside the clutch cover 21. The pressure plate 22 is made of, for instance, cast iron containing Cr, V and a rare earth element. The pressure plate 22 has a pressing surface 22a facing toward the flywheel 2. The pressure plate 22 has an annular projection 22b which projects in an axial direction from the surface opposite to the pressing surface 22a. Ends of a plurality of strap plates 24 which extend tangentially are fixed to the outer peripheral portion of the pressure plate 22 by bolts 28, as shown in FIG. 1. The other end of each strap plate 24 is fixed to the clutch cover 21. The strap plates 24 cause the pressure plate 22 can rotate together with the clutch cover 21 but allow for axial movement of the pressure plate 22 with respect to the clutch cover 21. These strap plates 24 bias the pressure plate 22 away from the flywheel 2.

The diaphragm spring 23 is disposed between the pressure plate 22 and the clutch cover 21. The diaphragm spring 23 has an annular elastic portion 23a and a plurality of levers 23b extending radially inward from the elastic portion 23a. The elastic portion 23a has an outer peripheral portion which is in contact with the annular projection 22b of the pressure plate 22, and has an inner peripheral portion which is supported by a supporting structure 25. The supporting structure 25 includes of a plurality of stud pins 26 and two wire rings 27. The plurality of stud pins 26 each have an end fixed to the radially inner portion of the bottom of the clutch cover 21, and extend toward the engine. These plurality of stud pins 26 support the two wire rings 27. A radially inner portion of the elastic member 23a is disposed between the two wire rings 27. Each stud pin 26 extends through a rounded rectangular aperture 23c at the diaphragm spring 23. The elastic portion 23a in this state biases the pressure plate 22 toward the flywheel 2.

The release device 8 is arranged between the diaphragm spring 23 and the transmission T, and is opposed to the radially inner ends of the levers 23b of the diaphragm spring 23. When the release device 8 is moved toward the flywheel 2, the release device 8 pushes the levers 23 toward the engine, counteracting the force of the elastic portion 23a acting on the pressure plate 22 and the pressure plate 22 is no longer urged toward the flywheel 2.

The clutch disk assembly 4 includes a clutch engagement portion 31 arranged between the flywheel 2 and the pressure plate 22. The clutch disk assembly 4 also includes clutch and retaining plates 32 and 33 which define input members, a hub 34 which defines an output member, coil springs 36 arranged between the plate pair 32 and 33 and a flange 35 of the hub 34, and a friction generating mechanism 37. The hub 34 has a boss 34a which is integrally provided at its outer periphery with the flange 35. The boss 34a is provided at its center with a spline aperture engagable with the main drive shaft 6. The clutch and retaining plates 32 and 33 are circular plates arranged at opposite sides of the flange 35, respectively. The clutch and retaining plates 32 and 33 have radially outer portions which are fixed together by contact pins 38. The coil springs 36 are arranged in windows formed at the plates 32 and 33 and the flange 35. The friction generating mechanism 37 includes a plurality of washers arranged between the plates 32 and 33 and the flange 35.

Figure 4:
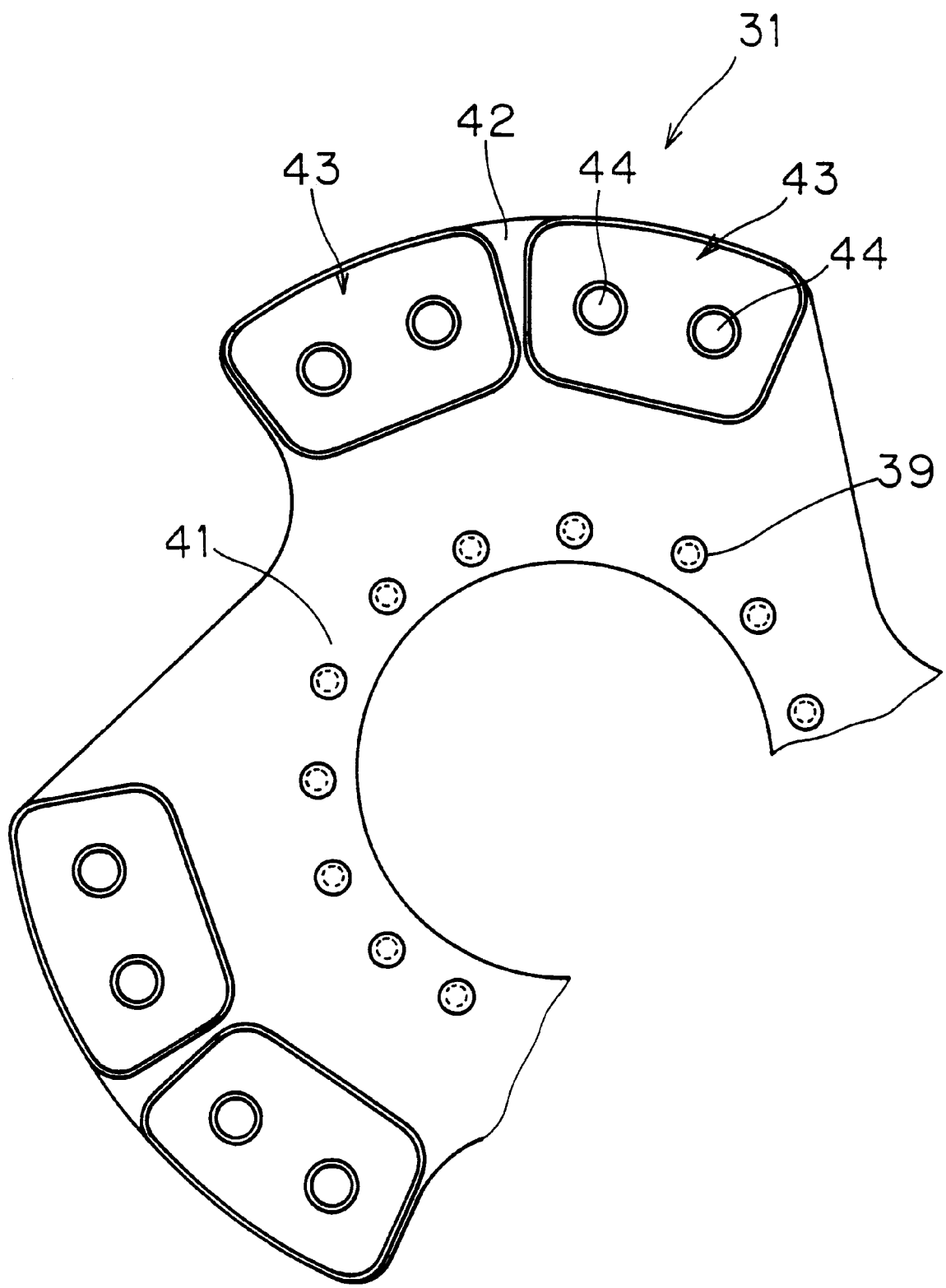
FIG. 4 is a fragmentary plan of a disk plate of a clutch disk assembly of the modular clutch depicted in FIG. 1, with the clutch disk assembly shown removed from the modular clutch.
Figure 5:
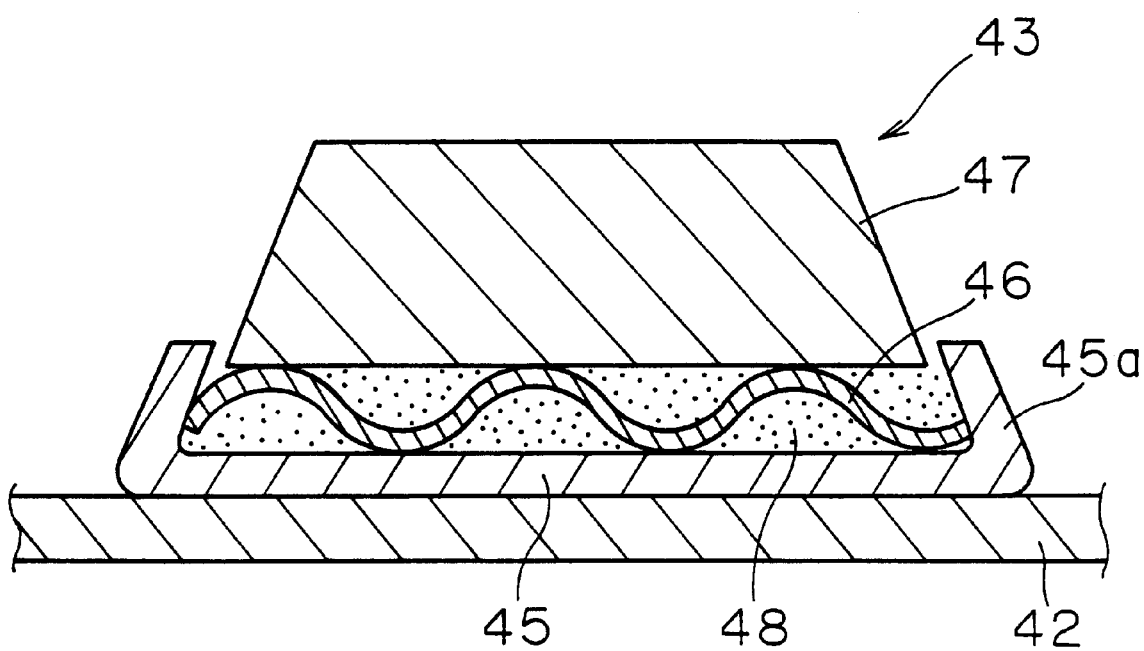
FIG. 5 is a schematic cross section of a portion of the clutch disk assembly depicted in FIG. 4, showing details of a friction pad of the clutch disk assembly in accordance with the first embodiment of the present invention.

As shown in FIGS. 3, 4 and 5, the clutch engagement portion 31 is basically formed of a disk plate 41 fixed to the clutch plate 32 and a plurality of friction pads 43 fixed to the disk plate 41. The disk plate 43 is a circular member as shown in FIG. 4, and has an inner peripheral portion fixed to the outer peripheral portion of the clutch plate 32 by rivets 39. The disk plate 41 is provided at its outer periphery with three projections 42. Each projection 42 supports two friction pads 43 on each side (i.e., four pads 43 in total). As shown specifically in FIG. 3, each friction pad 43 is formed of a core plate 45, a screen 46 and a sintered body 47. As shown in FIG. 3, each projection 42 and the core plates 45 of the friction pads 43 at its opposite sides are fixed together by two rivets 44. The sintered body 47 is provided with apertures corresponding to the rivets 44.

Referring to FIG. 5 showing, on an enlarged scale, the structure, description will be given on a specific structure of the friction pad 43. The screen 46 is disposed on the core plate 45. The screen 46 is formed of a metal mesh plate, and has a corrugated form. The core plate 45 and the sintered body 47 are adhered to the tops and bottoms of the screen 46, respectively. A space between the core plate 45 and the sintered body 47 is filled with particles of graphite 26. The core plate 45 is provided at its periphery with a projection 45a for preventing escape of the graphite 26.

The sintered body 47 is arranged on the screen 46, and is made of mixture of ceramic or graphite powder and powder of Cu-Sn alloy.

In the friction pad 43 thus constructed, the graphite 48 functions as a cushioning material between the core plate 45 and the sintered body 47. Thereby, noises during the clutch engaging operation can be reduced. The graphite 48 also functions as a heat insulator. As a result, heat transmission from the sintered body 47 to the disk plate 41, clutch plate 32 and retaining plate 33 is minimized, and bowing and deformation of these plate members are suppressed. This results in increase in lifetime of the clutch disk assembly 4.

Since the screen 46 has a corrugated form, it provides cushioning effect. Since the screen 46 has a mesh form, the graphite 48 can freely move between its opposite sides. This increases the cushioning effects of the graphite 48.

A method of manufacturing the friction pad 43 is as follows. First, the screen 46 is disposed on the core plate 45, and the graphite 48 is arranged substantially entirely over the screen 46. Then, the mixture of the powder of ceramics, graphite or the like and the powder of Cu-Sn is disposed over the graphite 48. These are heated at about 700° C., and are subjected to a predetermined pressure which does not flatten the screen 46.

A method of assembling the modular clutch 1 is described below. First, the diaphragm spring 23 and the pressure plate 22 are fixed to the clutch cover 21 to assemble them into the clutch cover assembly 21. At this time, the caulking portion 63 and the fixing portion 64 of the clutch cover 21 have straight forms. Then, the clutch cover assembly 3 and the clutch disk assembly 4 are assembled together, and the flywheel 2 is put into the clutch cover 21. In this step, the end surface of the outer peripheral portion of the flywheel 2 is brought into contact with the contact portion 65 of the clutch cover 21, so that the flywheel 2 and the clutch cover 21 are axially positioned together. Then, the apertures at the clutch cover 21 and the flywheel 2 are aligned together for inserting the pin 68 into them.

Thereafter, a caulking step is performed. Thereby, each caulking portion 63 of the clutch cover 21 is deformed to conform closely the surface and inclination of the inclined groove 2c of the flywheel 2. Each fixing portion 64 is bent 90 degrees and is pressed against the flat portion 2d of the flywheel 2. Then, the pin 68 is fitted into the apertures at the flat portion 2d of the flywheel 2 and the fixing portions 64. This prevents relative rotation between the flywheel 2 and the clutch cover 21. After assembling, the modular clutch 1 can be handled as one single module or component.

The completed modular clutch 1 is fixed by the bolts 11 to the flexible plate 7 which is already fixed to the crank shaft 5. The housing of the transmission T is provided with windows or holes (not shown) for manipulating the bolts 11.

The structure of the fixing unit 61 in this embodiment does not require a fastening member such as a bolt, thereby reducing the weight of the present invention, as compared to the prior art. Since the flywheel 2 and the clutch cover 21 are axially positioned with respect to one another by the caulking portion 65, a member such as a knock pin is not required, so that the structure is simplified, compared to the prior art, and may also be inexpensive compared to the prior art. Since the outer peripheral end of the clutch cover 21 is fixed to the flywheel 2 by caulking, the clutch cover 21 can be reliably fixed to the flywheel 2 in a simple manner.

Since this modular clutch 1 uses the friction pads 43 formed of the metallic sintered bodies 47, the clutch engagement portion 31 can have a longer lifetime than that in the prior art. Thus, the modular clutch 1 does not require replacement of the clutch disk assembly 4 as often as in prior art configurations without such sintered bodies. Therefore, there is little disadvantage to the modular construction of the present invention even though the flywheel 2 and the clutch cover 21 are coupled together by caulking.

The first flywheel 2 and the pressure plate 22 are made of cast iron additionally containing Cr, V and a rare earth element. As a result, wear of the first flywheel 2 and the pressure plate 22 is reduced, and the whole modular clutch 1 has an increased life expectancy.

SECOND EMBODIMENT

Figure 6:
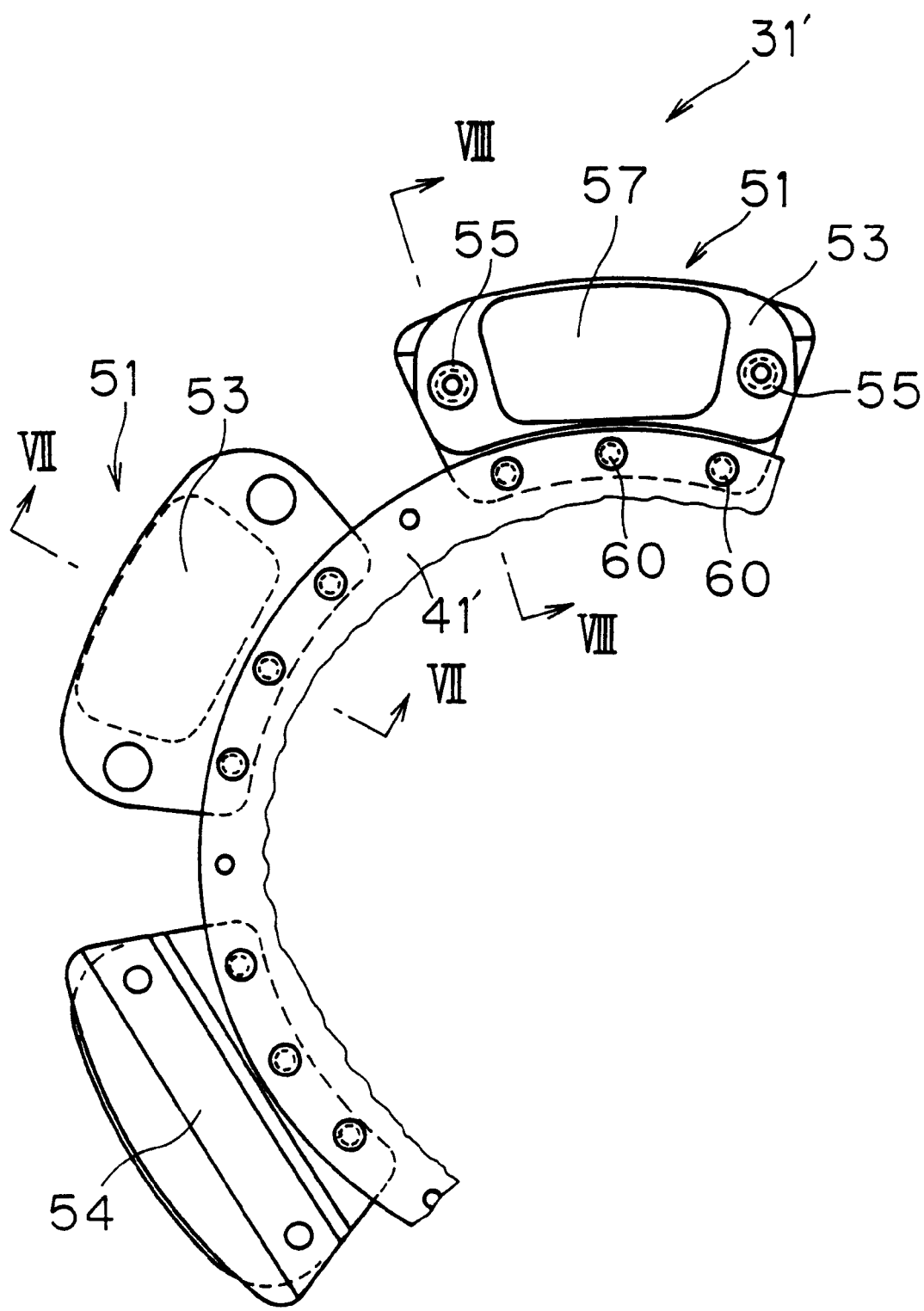
FIG. 6 is a fragmentary plan of a clutch disk assembly in accordance with a second embodiment of the present invention.
Figure 7:
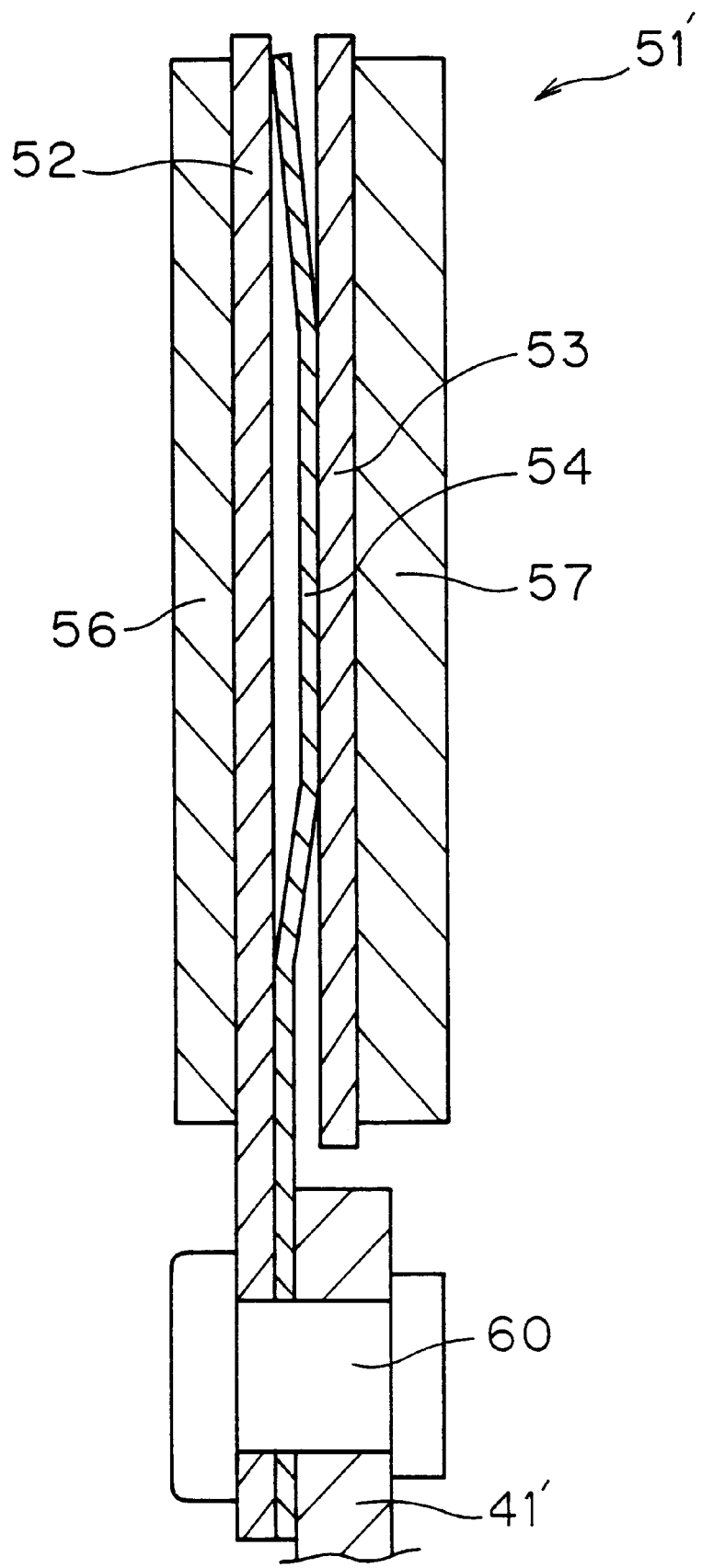
FIG. 7 is a schematic cross section of a portion of the clutch disk assembly depicted in FIG. 6, taken along line VII—VII in FIG. 6, showing details of a friction pad and cushioning plate of the clutch disk assembly in accordance with a second embodiment of the present invention.
Figure 8:
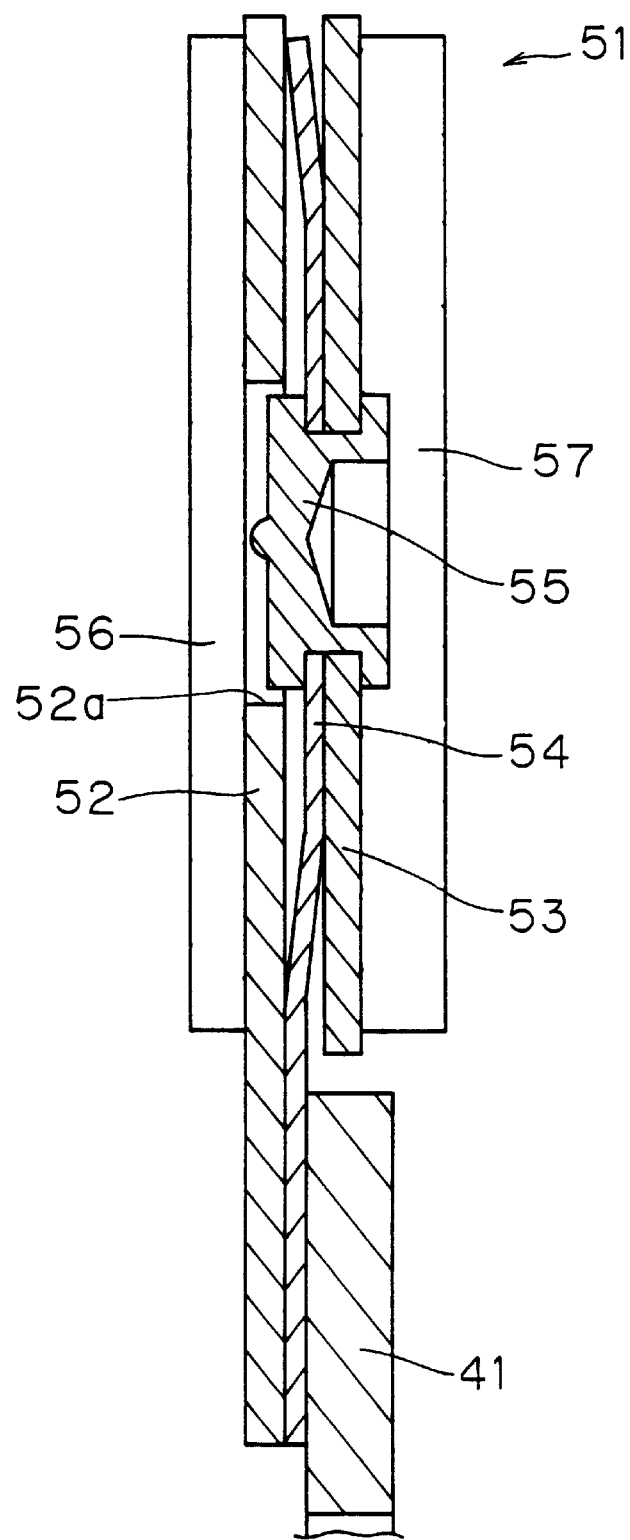
FIG. 8 is a cross section taken along line VIII—VIII in FIG. 6.
Figure 9:
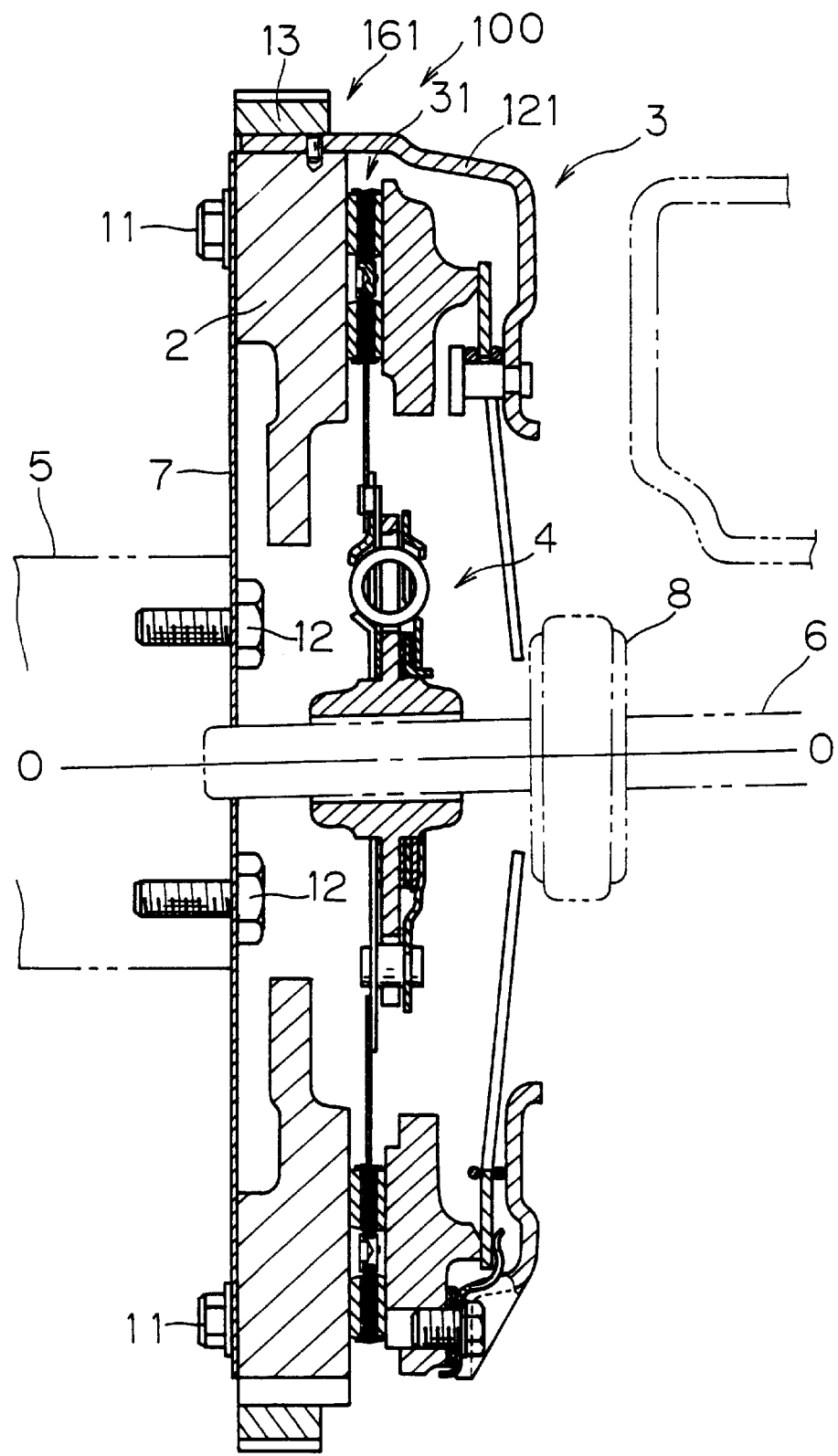
FIG. 9 is a schematic cross section view of a modular clutch in accordance with a third embodiment of the present invention, having an alternate means of attaching a clutch cover assembly to a flywheel.
Figure 10:
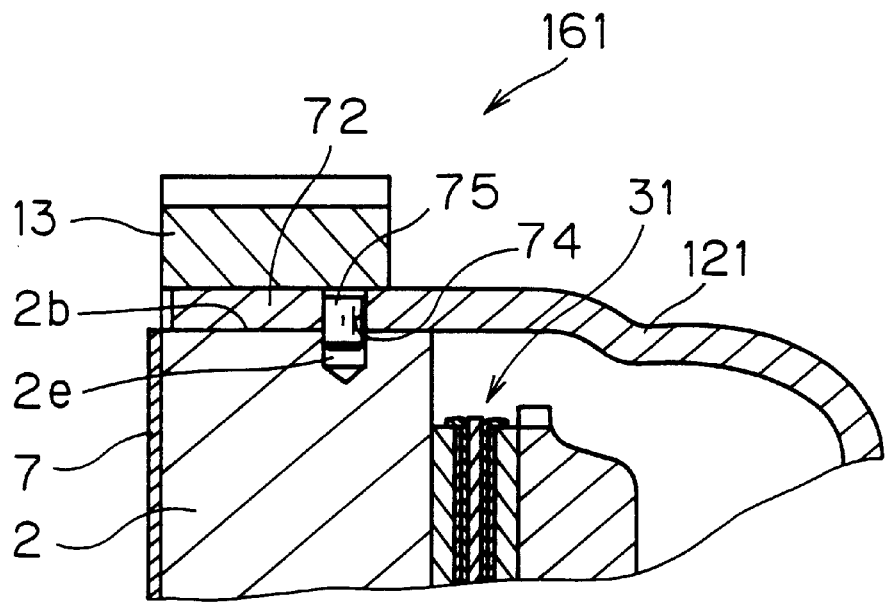
FIG. 10 is a fragmentary cross section view of a portion of the modular clutch depicted in FIG. 9, on an enlarged scale, showing details of the means for attaching the clutch cover assembly to the flywheel.

The clutch engagement portion 31' shown in FIGS. 6 to 8 may be used instead of the clutch engagement portion 31' in the first embodiment. The clutch engagement portion 31' is formed with a plurality of clutch coupling members 51. The plurality of clutch coupling members 51 are fixed to the outer peripheral edge of a disk plate 41' by rivets 60 and are circumferentially equally spaced apart from each other.

Each clutch coupling member 51 is formed of first and second core plates 52 and 53 made of steel plates, a cushioning plate 54, and first and second sintered bodies 56 and 57 made of a composite material of ceramics and metal, as shown in FIGS. 7 and 8. The first core plate 52 and the cushioning plate 54 extend radially inwardly beyond the second core plate 53, and the first core plate 52 and cushioning plate 54 are fixed to the disk plate 41 by the rivets 60. A cushioning portion of the cushioning plate 54 has a stepped or corrugated form and is arranged between the first and second core plates 52 and 53. Thus, the cushioning plate 54 has inner and outer peripheries in contact with the first core plate 52, and a radially middle portion in contact with the second core plate 53, as is shown in FIG. 8. As is also shown in FIGS. 6 and 8, circumferentially opposite ends of each of the cushioning plates 54 and each of the second sintered body 57 are fixed together by rivets 55. The first core plate 52 is provided with apertures 52a located at positions corresponding to the rivets 55. The first sintered body 56 extends circumferentially between the apertures 52a of the first core plate 52, and the second sintered body 57 is extends circumferentially between the rivets 55 of the second core plate 53. The first and second sintered bodies 56 and 57 are adhered to first and second core plates 52 and 53, respectively.

The cushioning plate 54 can reduce vibration and noises during start of the vehicle. The elasticity of the cushioning plate 54 acts in the direction opposite to the pressing pressure of the pressure plate 22, and therefore reduces a force required for depressing a clutch pedal. In particular, since wear of the friction member 57 is suppressed, the relationship between the pressing force required to disengage the clutch and the elastic force of the diaphragm spring does not substantially vary over the useable life of the clutch module. Thus, a low pedal depressing force is maintained. Consequently, it is not necessary to employ a complicated friction adjusting mechanism.

Alternatively, rubber or other elastic material may be used instead of the cushioning plate 54. Alternatively, unwoven fabric such as steel wool having a heat resistance may be employed.

THIRD EMBODIMENT

A modular clutch 100 shown in FIGS. 9 to 12 has many features that are similar to those described above with other embodiments. Therefore, generally, only those features that differ from the modular clutch of the first embodiment will be described. In the modular clutch 100, the cover fixing unit 161 has many different features, as described below. The clutch engagement portion 31 is generally the same as that in the first embodiment but could alternatively be as described with respect to the second embodiment.

Figure 11:
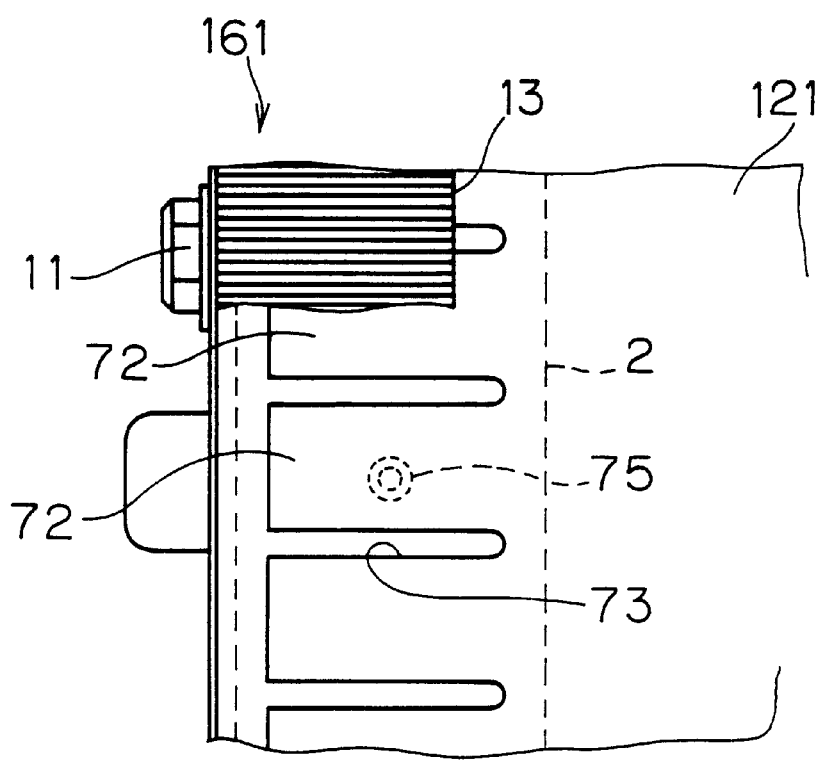
FIG. 11 is a fragmentary elevation of a portion of the exterior of clutch cover assembly of the modular clutch depicted in FIG. 9.

In the modular clutch 100, a clutch cover 121 is provided at its outer peripheral end with a plurality of outer cover strips 72 which extend axially. The outer cover strips 72 are defined by a plurality of slits 73 which extend axially therebetween, as shown in FIG. 11. The outer cover strips 72 cover and contact the outer peripheral surface 2b of the flywheel 2.

A ring gear 13 is shrink-fitted around the outer cover strips 72 of the clutch cover 121. The ring gear 13 is provided at its radially outer portion with gear teeth that mesh with a pinion gear of a starter motor. Apertures 74e and 2e are formed at the outer cover strip 72 of the clutch cover 121 and the outer peripheral surface 2a of the flywheel 2, respectively. A pin 75 is fitted into the apertures 74 and 2e. The pin 75 stops relative rotation between the clutch cover 121 and the flywheel 2.

The outer cover strip 72 of the clutch cover 121 is tightly fixed to the outer peripheral surface 2b of the flywheel 2 by the shrink-fitted ring gear 13.

An assembling operation of the modular clutch 100 will be described below. First, the clutch disk assembly 4 is arranged inside the clutch cover assembly 3, and the flywheel 2 is inserted into the clutch cover 121 of the clutch cover assembly 3. In this operation, the apertures 74 and 2e of the clutch cover 121 and the flywheel 2 are aligned together, and the pin 75 is fitted into these apertures. Thereby, the clutch cover 121 is prevented from relative rotation with respect to the flywheel 2.

In this state, the ring gear 13 is heated. If necessary, the clutch cover 121 and the flywheel 2 are cooled. Then, the ring gear 13 having an expanded inner diameter owing to the heating is shrink-fitted to the plurality of outer cover strips 72. The inner diameter of the ring gear 13 thus fitted shrinks, so that the outer cover strips 72 of the clutch cover 121 and ring gear 13 are tightly fixed to the outer peripheral surface 2b of the flywheel 2. Even if the inner diameter of the clutch cover 121 is larger than the outer diameter of the flywheel 2 due to a work error, the plurality of outer cover strips 72 bend inward in accordance with shrinkage of the ring gear 13, and therefore is brought into tight and close contact with the outer peripheral surface 2b. Thus, the clutch cover 121 is reliable fixed to the outer peripheral surface 2b owing to provision of the plurality of outer cover strips 72 defined by the plurality of slits 73. In this manner, the modular clutch 100 is completed.

In this embodiment, the ring gear 13 is shrink-fitted to the flywheel 2, and simultaneously the clutch cover 121 is fixed to the outer peripheral surface 2b of the flywheel 2. Therefore, only one step is required instead of conventional two steps, i.e., a step for fixing the ring gear to the flywheel and a subsequent step for fixing the clutch cover to the flywheel. Since the clutch cover 121 and the flywheel 2 are fitted together substantially entirely through the outer peripheral surfaces thereof, strong fitting can be maintained for a long term compared with a conventional structure using a plurality of bolts for fixing them. Since a fastening member such as a bolt is not required, the whole structure can be inexpensive and can have a reduced weight.

Figure 12:
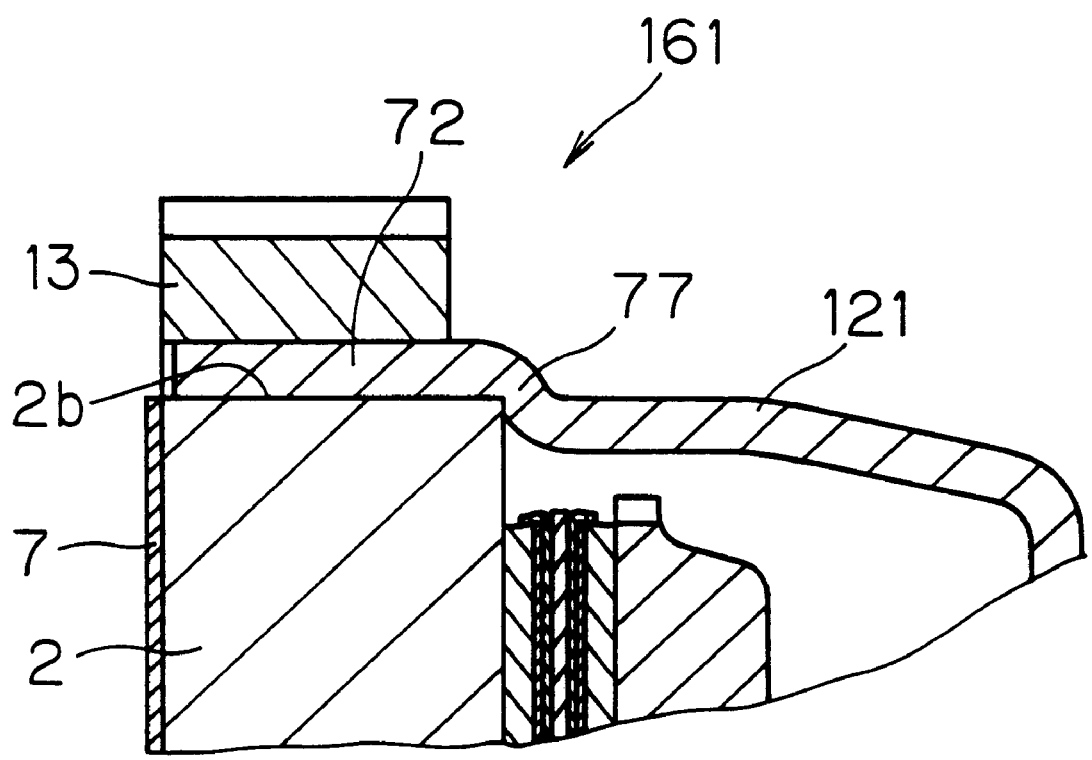
FIG. 12 is a fragmentary cross section view similar to FIG. 10, of a modified portion of the modular clutch depicted in FIG. 9, on an enlarged scale, showing slightly modified details of the means for attaching the clutch cover assembly to the flywheel.

In a modification of this embodiment, as shown in FIG. 12, a contact portion 77 may be formed by caulking the outer peripheral portion (near the base ends of the outer cover strips 72) of the clutch cover 121 radially inward. This contact portion 77 is provided with a contact surface which is in contact with the outer peripheral edge of the flywheel 2 near the friction surface 2a. The contact between the contact portion 77 and the outer peripheral edge of the flywheel 2 acts to position axially the clutch cover 121 and the flywheel 2 when fitted together. In this case, the pin 75 is not required.

FOURTH EMBODIMENT

Figure 13:
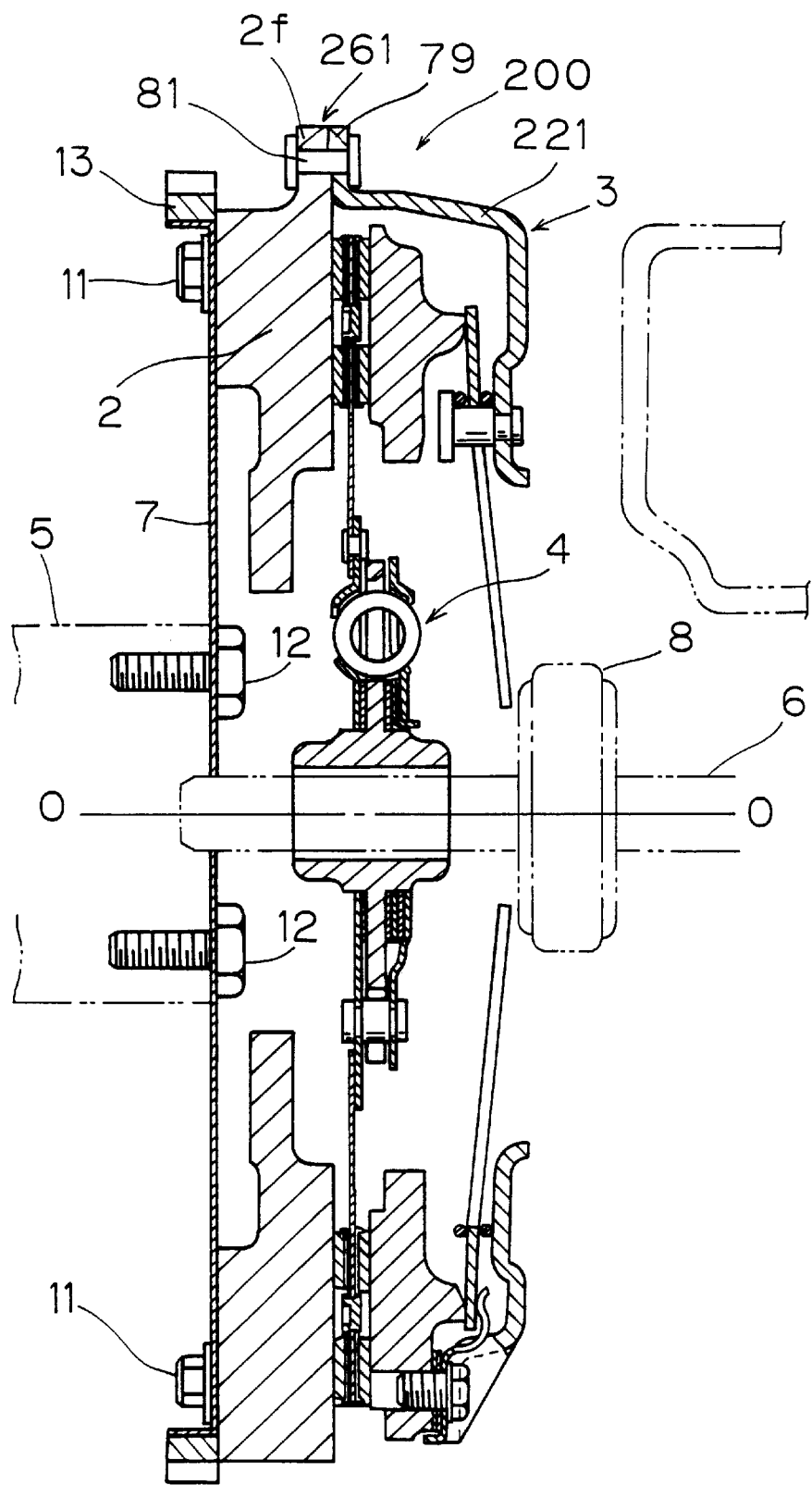
FIG. 13 is a schematic cross section view of a modular clutch in accordance with a fourth embodiment of the present invention, having a further means of attaching a clutch cover assembly to a flywheel.

In a modular clutch 200 shown in FIG. 13, the clutch cover 221 is fixed to the flywheel 2 by rivets. More specifically, a cover fixing unit 261 has the following structure. The flywheel 2 is provided at its outer peripheral portion with outer projections 2f which project radially outward. The clutch cover 221 is provided with outer fixing portions 79 corresponding to the outer projections 2f, respectively. The outer projection 2f and the outer fixing portion 79 are fixed together by a rivet 81.

FIFTH EMBODIMENT

Figure 14:
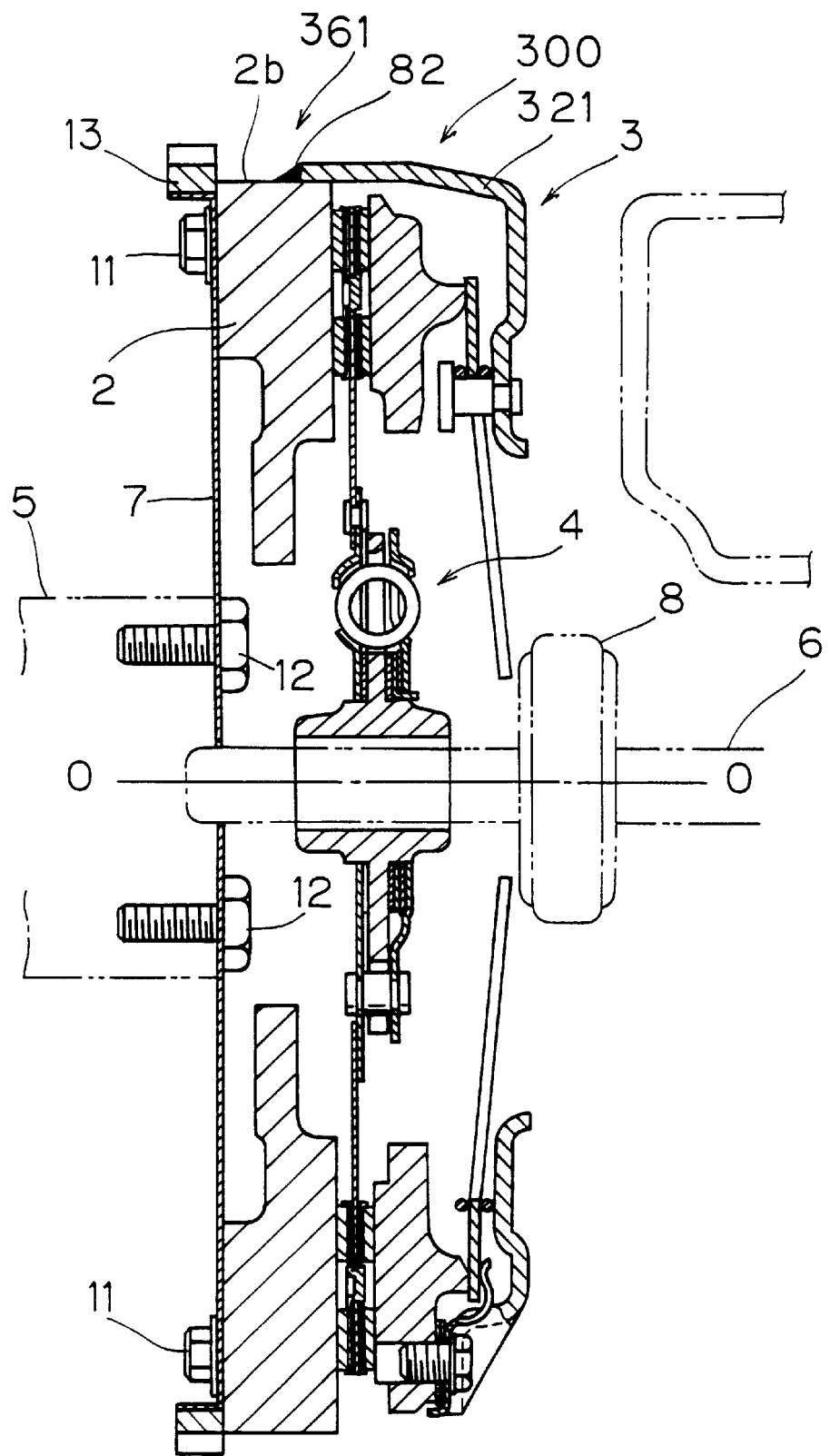
FIG. 14 is a schematic cross section view of a modular clutch in accordance with a fifth embodiment of the present invention, having further means of attaching a clutch cover assembly to a flywheel.

According to a modular clutch 300 shown in FIG. 14, the clutch cover 321 is welded to the flywheel 2. More specifically, a cover fixing unit 361 has the following structure. The clutch cover 321 has an outer peripheral end which is in contact with the outer peripheral portion 2b of the flywheel 2. The outer peripheral end of the clutch cover 321 is fixed to the outer peripheral surface 2b through a welded portion 82.

SIX EMBODIMENT

Figure 15:
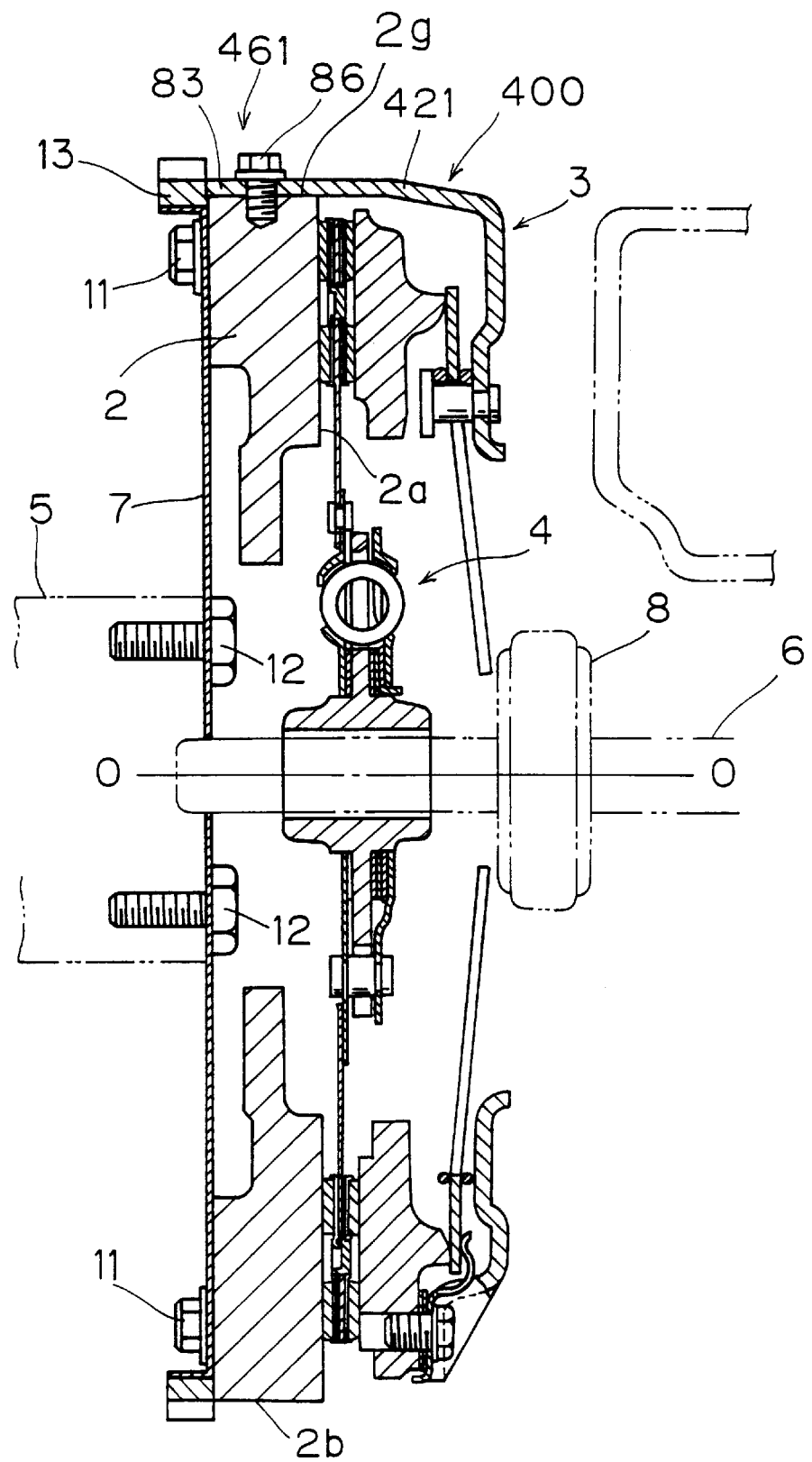
FIG. 15 is a schematic cross section view of a modular clutch in accordance with a sixth embodiment of the present invention, having a cover coupling unit as a means of attaching a clutch cover assembly to a flywheel.
Figure 16:
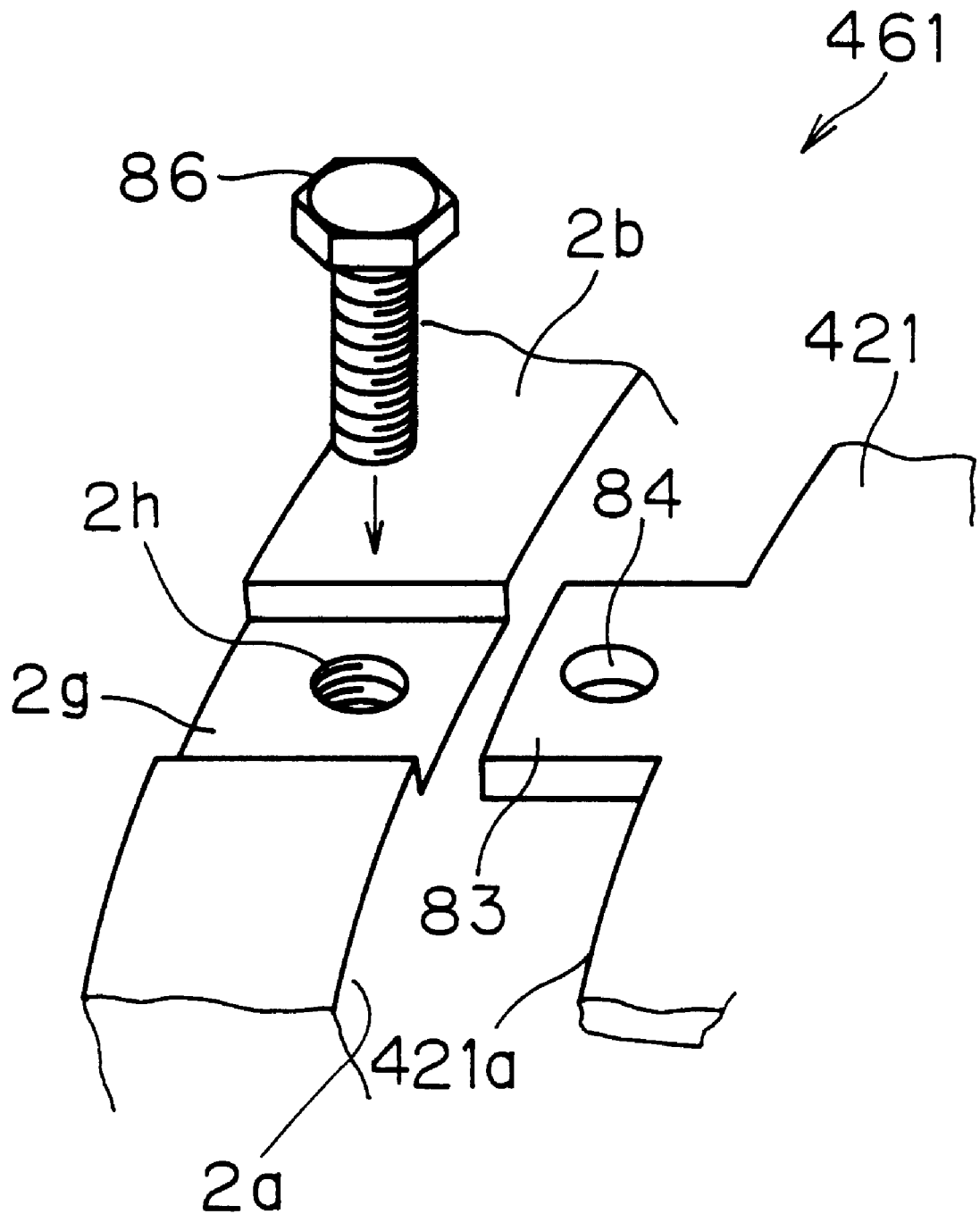
FIG. 16 is a fragmentary perspective view of the cover coupling unit of the modular clutch depicted in FIG. 15, on a slightly enlarged scale.
Figure 17:
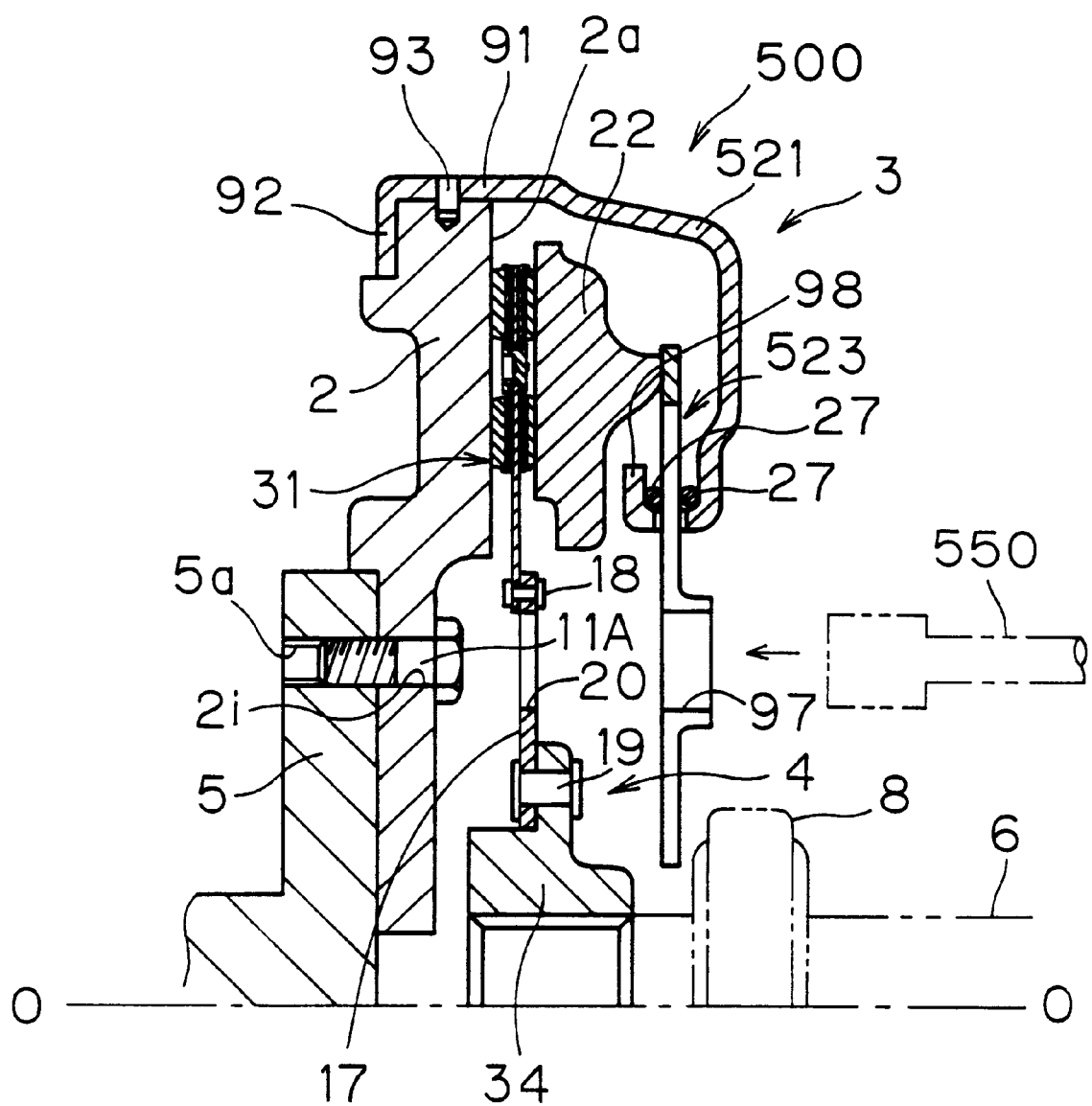
FIG. 17 is a schematic cross section view of a modular clutch in accordance with a seventh embodiment of the present invention, having flywheel directly attached to the crankshaft of the engine.

According to a modular clutch 400 shown in FIGS. 15 and 16, a clutch cover 421 is fixed to the flywheel 2 by bolts. More specifically, a cover fixing unit 461 has the following structure. The clutch cover 421 is provided at its outer peripheral end with projections 83 projecting axially from the end surface 421a. The projections 83 are formed over an entire circumference with equal spaces therebetween, and each have an aperture 84 at its center. The flywheel 2 is provided at its outer peripheral surface 2b with grooves 2g. A thread hole 2h which extends radially is formed within the groove 2g. The groove 2g forms a tangential flat seat surface. The projection 84 is engaged with the groove 2g, and is fixed to the flywheel 2 by a bolt 86.

A manner of assembling the modular clutch 400 will be described below. First, the clutch disk assembly 4 is positioned inside the clutch cover assembly 3, and the flywheel 2 is inserted into the clutch cover 421. In this operation, the projection 83 is fitted into the groove 2g of the flywheel 2, and the end surface 421a is brought into contact with of the flywheel 2 near the friction surface 2a, all being axially positioned together. In this state, the bolt 86 is inserted into the aperture 84 of the fixing portion 83, and is screwed into the thread hole 2h. Thereby, the clutch cover 421 is fixed to the flywheel 2. Since the groove 2g provides a flat seat surface, the projection 83 of the clutch cover 421 is pressed against the groove 2g and thereby is flattened. Thereby, contact between the projection 83 and the surfaces of the groove 2g as well as a contact area between the projection 83 and the seat surface of the bolt 86 provide rigid connection between the clutch cover 421 and the flywheel 2.

In this embodiment, there is sufficiently large contact between the projection 83 of the clutch cover 421 and the flywheel 2 and the projection 83 is fixed by the bolt 86 after the projection 83 is fitted to the groove 2g of the flywheel 2. Therefore, shear forces generated in the clutch cover 421 do not directly act on the bolt 86. Therefore, there is little possibility of breakage of the bolt. Therefore, it is possible to minimize the number the bolts required for fixing the clutch cover 421.

SEVENTH EMBODIMENT

A modular clutch 500 shown in FIGS. 17 to 20 is basically formed of the flywheel 2, the clutch cover assembly 3 and the clutch disk assembly 4. The modular clutch 500 is fixed to the crank shaft 5 in a manner which is described below.

The friction surface 2a is formed at the transmission side of the outer peripheral portion of the flywheel 2. The flywheel 2 is fixed to the crank shaft 5 by a plurality of bolts 11A. More specifically, the crank shaft 5 is provided with thread apertures 5a, and the flywheel 2 is provided with apertures 2i for the bolt 11A.

The clutch cover assembly 3 is basically formed of a clutch cover 521, the pressure plate 22 and the diaphragm spring 23. The clutch cover 521 has a dish-like shape, and has a large aperture at its center. The clutch cover 521 has an outer peripheral portion which extends axially and is in close contact with the outer peripheral surface 2b of the flywheel 2, and also has an outer peripheral end which is bent radially inward and is engaged with the bottom surface of the flywheel 2 at the engine side. The outer peripheral portion of the clutch cover 521 and the outer peripheral portion 2b of the flywheel 2 are coupled together by a pin 93.

Figure 18:
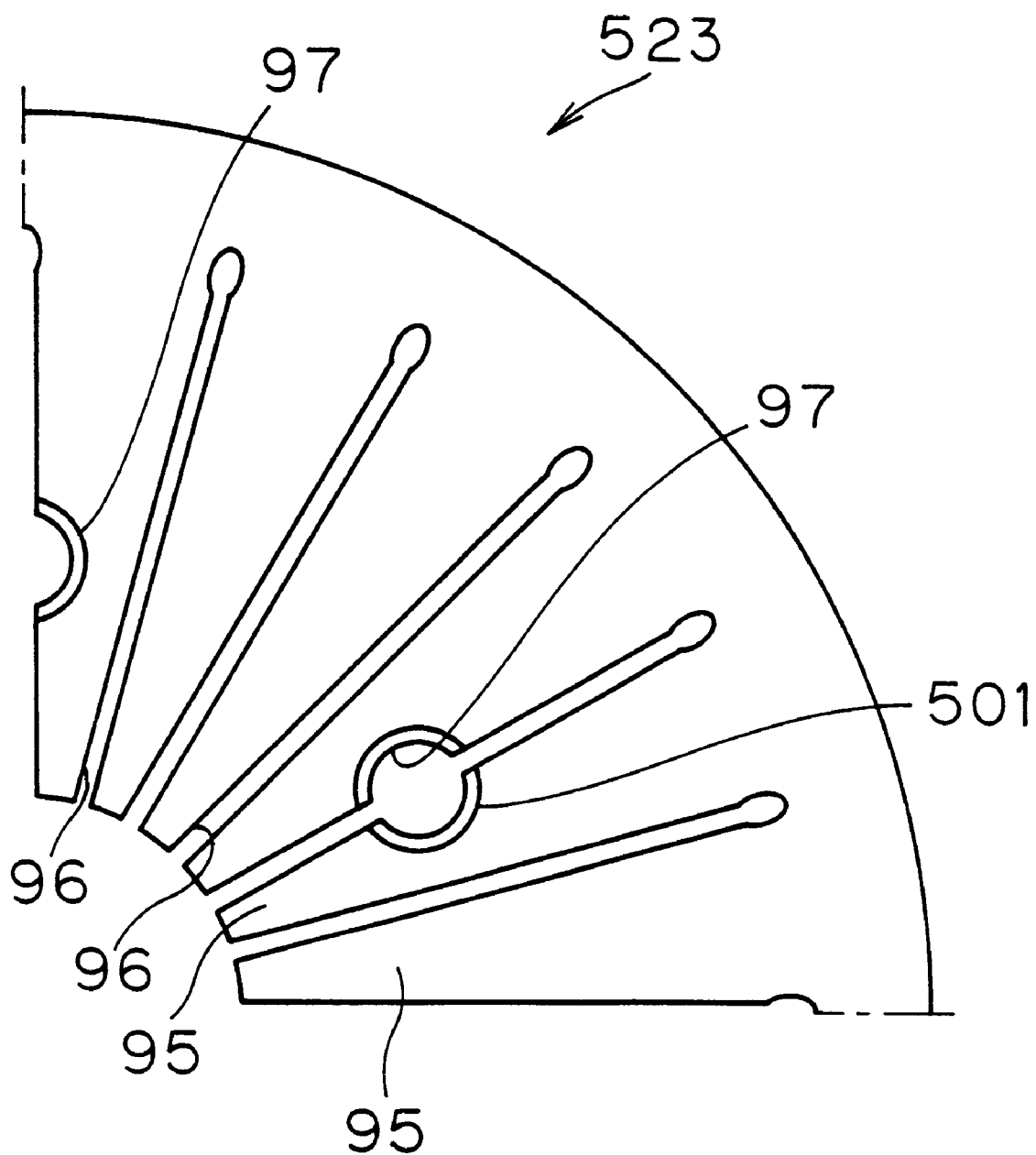
FIG. 18 is a fragmentary plan of a diaphragm spring shown removed from the modular clutch depicted in FIG. 17.
Figure 19:
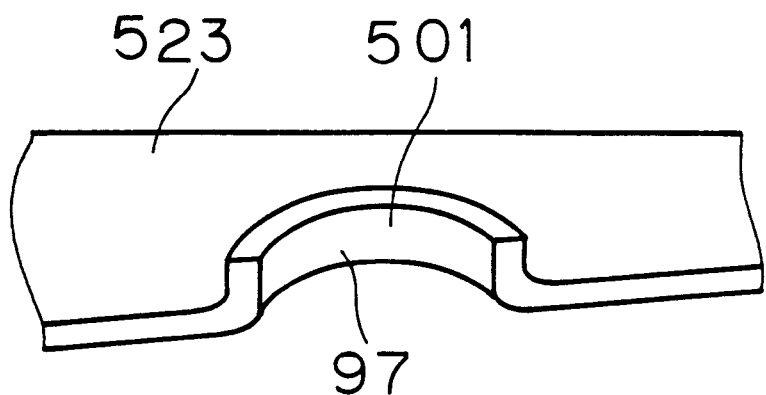
FIG. 19 is a fragmentary perspective view of an aperture formed in the diaphragm spring depicted in FIG. 18.

A diaphragm spring 523 is disposed in the cover 521 and is a generally circular member arranged between the clutch cover 521 and the pressure plate 22. The diaphragm spring 523 has a radially middle portion which is supported by the clutch cover 521 through the two wire rings 27. The wire rings 27 are held by a plurality of tags 98 which extend from the inner peripheral edge of the bottom of the clutch cover 521 and have bent or curved forms. The outer peripheral end of the diaphragm spring 523 is in contact with the pressure plate 22 and biases the pressure plate 22 toward the flywheel 2. The diaphragm spring 523 is provided with slits 96 extending radially inward from the portion near the outer peripheral end, as can be seen in FIG. 18. These slits 96 define a plurality of levers 95. The diaphragm spring 523 is provided at its radially middle portion with a plurality of circumferentially equally spaced apertures 97. Each aperture is circumferentially concentric with the corresponding slit 96. The aperture 97 has a diameter which allows insert of a box tool 550 for fastening the bolt 11A. As shown in FIG. 19, the diaphragm spring 523 is provided at portions around the apertures 97 with burrings 501 which project substantially perpendicularly to the plane of the diaphragm spring 523 and have a predetermined height. Therefore, the diaphragm spring 523 can have a high lever rigidity in spite of provision of the apertures 97.

The clutch disk assembly 4 is basically formed of the clutch engagement portion 31 similar to that already described in the first embodiment as well as the hub 34 and the plate 17. The inner peripheral portion of the plate 17 is fixed to the flange of the hub 34 by the rivets 19. The outer peripheral portion of the plate 17 is fixed to the clutch engagement portion 31 by the rivets 18. A plurality of apertures 20 are formed at a radially middle portion of the plate 17. Each aperture 20 has a diameter allowing insert of the box tool 550 for fastening the bolt 11A. The hub 34 has a spline aperture coupled to the main drive shaft 6 of the transmission.

In the assembly process of the modular clutch 1, apertures for the pin 93 are aligned with each other prior to fixing of the clutch cover 521 to the flywheel 2. Thereby, the aperture 2i of the flywheel 2 is axially aligned with the aperture 93 of the diaphragm spring 523.

The assembled modular clutch 500 is fixed to the crank shaft 5 by the following manner. The aperture 20 of the plate 17 of the clutch disk assembly 4 is aligned with the apertures 97 and 2i. Thereby, the apertures 2i, 20 and 97 formed at the parts of the modular clutch 1 are axially aligned together. Then, the modular clutch 1 is fitted around the crank shaft 5. At this operation, the radially inward flange of the flywheel 2 is brought into close contact with the end surface of the crank shaft 5, and the thread apertures 5a of the crank shaft 5 are aligned with the apertures 2i of the flywheel 2. In this state, the box tool 550 holding the bolt 11a is inserted from the transmission side into the apertures 97, 20 and 2i of the diaphragm spring 23, plate 17 and flywheel 2, and the bolt 11a is inserted into the thread aperture 5a of the crank shaft 5 for fastening the same.

Figure 20:
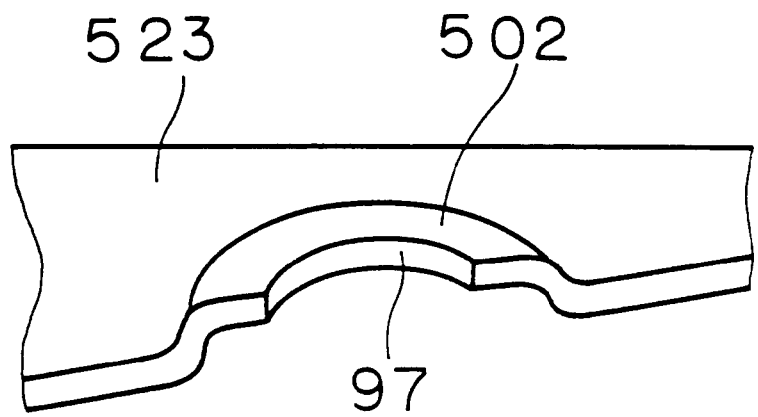
FIG. 20 is a fragmentary perspective view of an alternately formed aperture in the diaphragm spring depicted in FIG. 18.

In a modification of this embodiment, as shown in FIG. 20, the diaphragm spring 523 may be provided around the apertures 97 with drawn portions 502 for ensuring a sufficient rigidity. Since the rigidity of the levers of the diaphragm spring is not reduced as described above, the clutch can maintain a sufficiently sharp disengaging property.

EIGHT EMBODIMENT

Figure 21:
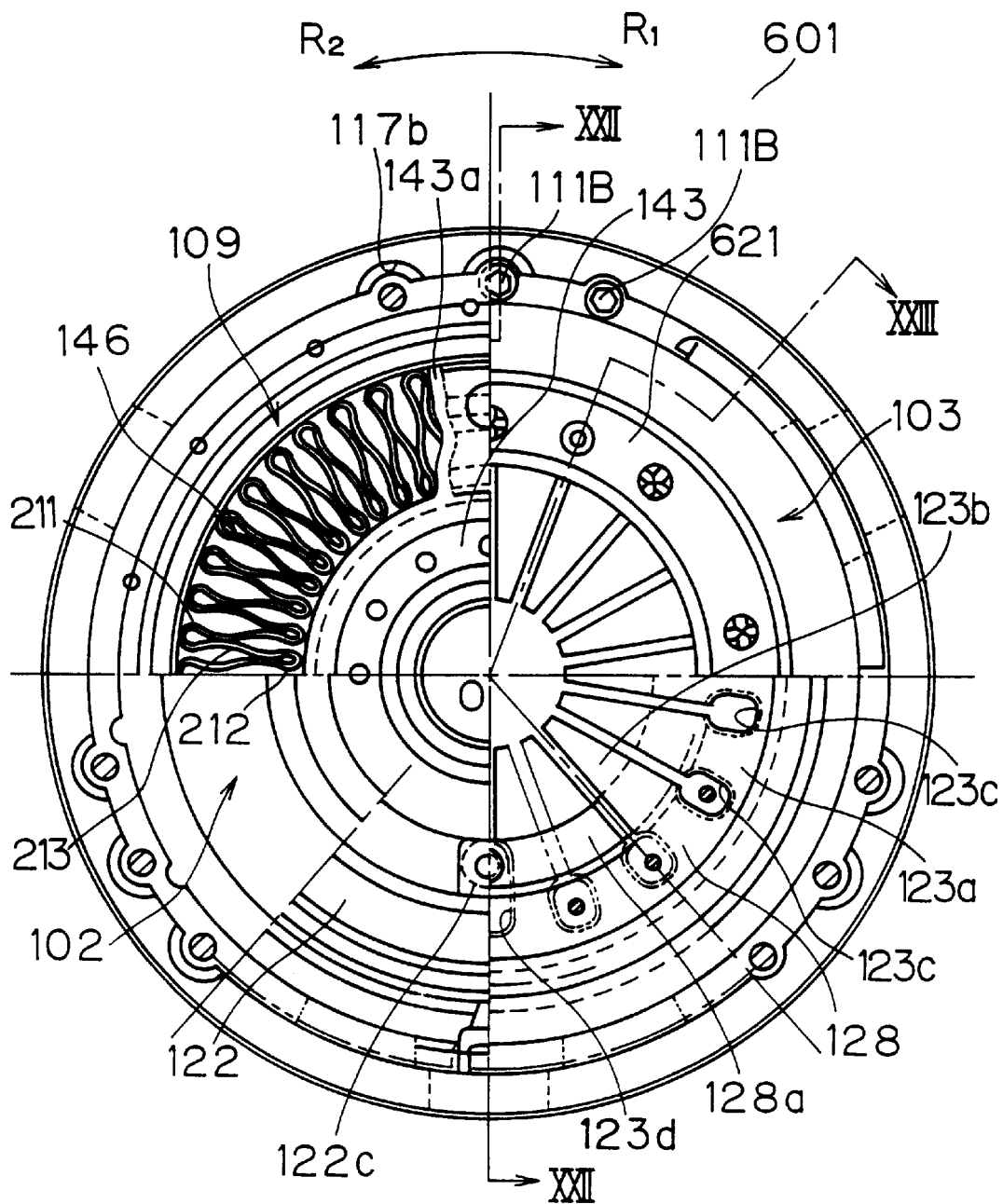
FIG. 21 is a part elevation, part cut away and part plan view of a modular clutch in accordance with an eighth embodiment of the present invention.
Figure 22:
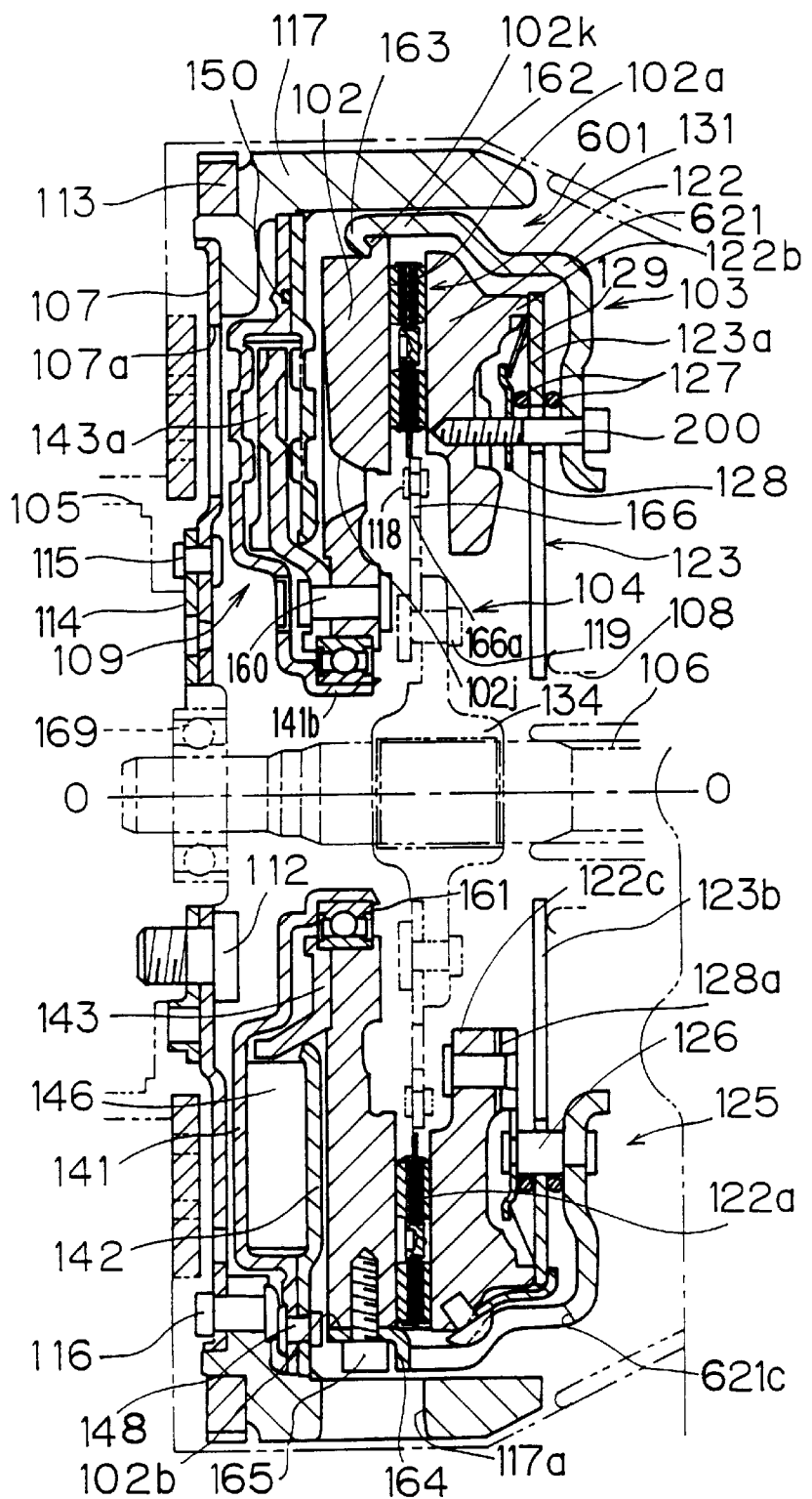
FIG. 22 is a side schematic cross section view of the modular clutch depicted in FIG. 21, taken along the line XXII—XXII in FIG. 21.
Figure 23:
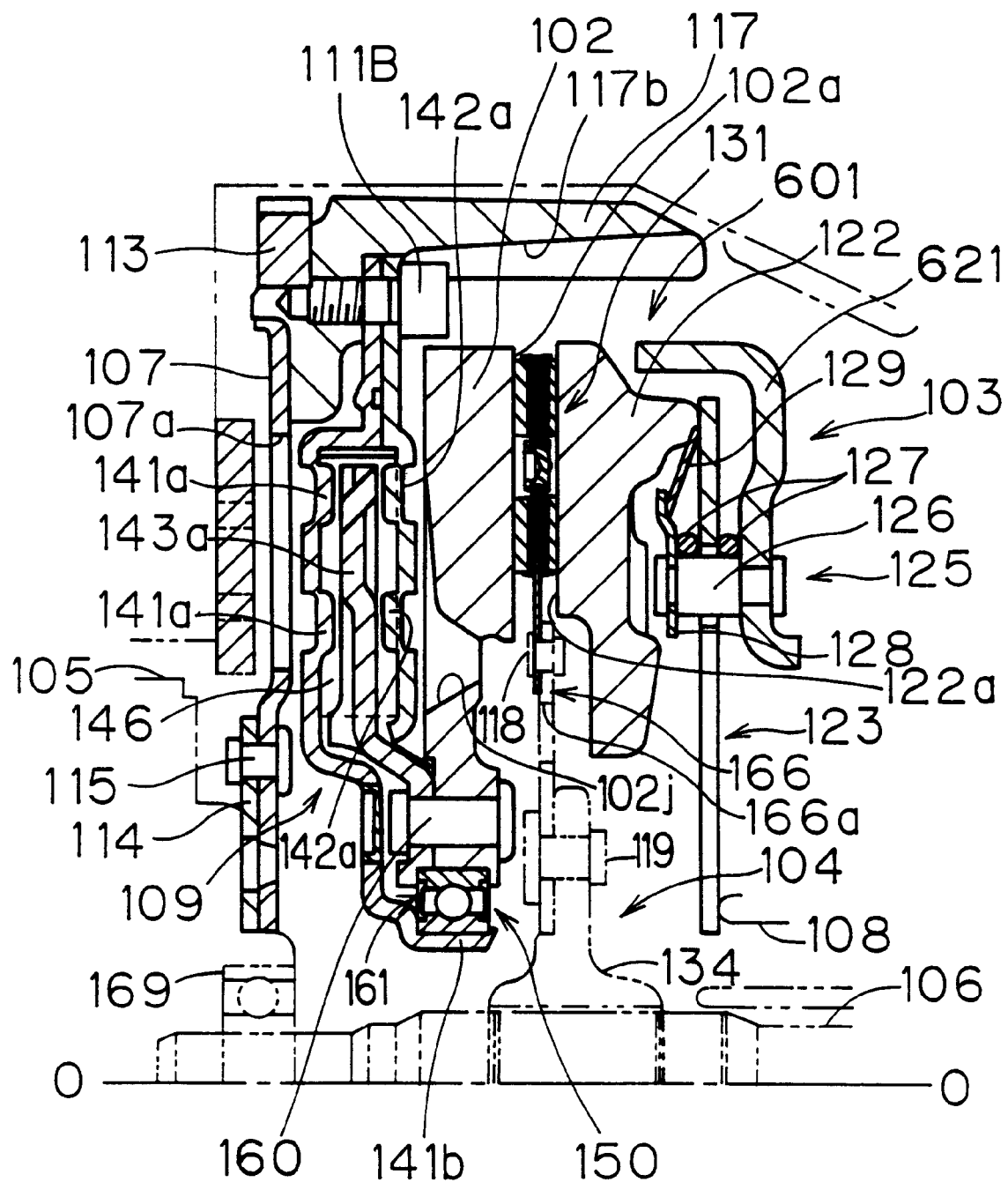
FIG. 23 is a fragmentary, cross sectional view similar to FIG. 22, taken along the line XXIII—XXIII in FIG. 21.

A modular clutch 601 shown in FIGS. 21 to 23 is basically formed of a flywheel 102, a clutch cover assembly 103, a clutch disk assembly 104 and a damper mechanism 109. An engine (not shown) is arranged at the left side in FIGS. 22 and 23, and a transmission (not shown) is arranged at the right side. The modular clutch 601 is operable to transmit and interrupt the torque from a crank shaft 105 of the engine to a main drive shaft 106 extending from the transmission. In FIGS. 22 and 23, O—O represents a rotation axis of the modular clutch 601.

A flexible plate 107 and an inertia member 117 (second flywheel) is arranged at the end of the crank shaft 105. The flexible plate 107 is a circular plate member, and a circular plate member 114 is fixed to the inner peripheral portion thereof by rivets 115. The inner peripheral portion of the flexible plate 107 is fixed to the crank shaft 105 at the engine side together with the plate member 104 by bolts 112. The flexible plate 107 is provided at its radially middle portion with a plurality of circumferentially equally spaced round apertures 107a. The flexible plate 107 has a high rigidity in the circumferential direction, but is flexible in the bending direction.

The inertia member 117 is fixed to the outer peripheral end of the flexible plate 107 by the rivets 116. The inertia member 117 is an axially extended cylindrical member. A ring gear 113 is fixed to the inertia member 117. The inertia member 117 is provided at circumferentially equally spaced three positions with manipulation apertures 117a for communicating the radially inner and outer sides with each other.

As described above, the flexible plate 107 and inertia member 117 are arranged in advance at the crank shaft side, and the modular clutch 601 is attached thereto, as described below.

The damper mechanism 109 is basically formed of a first input plate 141, a second input plate 142, a bent plate spring 146 and a driven member 143. The first input plate 141 is circular and is arranged beside the flexible plate 107. The first input plate 141 has an outer peripheral portion which is in contact with an inner peripheral surface of the inertia member 117. The first input plate 141 has a radially middle portion which is convexed toward the transmission. The second input plate 142 is circular and is arranged beside the first input plate 141. The second input plate 142 has an outer peripheral end which is in contact with the inner peripheral surface of the inertia member 117. The outer peripheral portions of the first and second input plates 141 and 142 are in contact with each other, and are fixed together by rivets 148 with a seal ring 150 therebetween. The inner peripheral portion of the first input plate 141 extends radially inward beyond the inner periphery of the second input plate 142. The inner peripheral portion of the first input plate 141 is formed with an inner projection 141b having a cylindrical shape extending away from the engine side.

The outer peripheral portions of the first and second input plates 141 and 142 are fixed to the inertia member 117 by three circumferentially equally spaced bolts 111B. The bolts 111B are attached from the transmission side. The inertia member 117 is provided with grooves 117b at positions corresponding to the bolts 111B, respectively.

An annular space defined between the first and second input plates 141 and 142 forms a spring accommodating chamber. A pair of bent plate springs 146 are disposed within the spring accommodating chamber.

The bent plate spring 146 arranged in each arc-shaped chamber is described below. As shown in FIG. 21, each bent plate spring 146 is made of an elongated plate having a predetermined width, the elongated plate being bent into an undulated, or corrugated form defining a plurality of spring portions laid side by side in series, each spring portion having one each of ring portions 211 and 212 and lever portions 213, all continuously formed. The outer ring portions 211 and inner ring portions 212 are arranged alternately to each other, and have ends, which form circumferentially small spaces opposed to each other. Each end is connected to the end of the opposed ring portion by the lever portion 213. The ring portions 213 diverge from the ring portion 211 or 212 toward the ring portions 212 or 211. Each of the ring portions 211 and 212 has such an irregular section such that its thickness gradually decreases from the end toward the center, and therefore has a lower rigidity than the lever portion 213. The outer ring portion 211 has a larger diameter than the inner ring portion 212. Use of the bent plate spring 146 makes it possible to minimize the axial dimensions of the viscosity damper mechanism 109 when compared to a similar device having coil springs.

The spring accommodating chamber is filled with powder solid lubricant such as molybdenum disulfide. The powder solid lubricant is mixed with air and is disposed in the spring accommodating chamber. Also, the powder solid lubricant easily adheres onto surfaces of the walls of the spring accommodating chamber, i.e., surfaces of the first input plate 141, second input plate 142, driven member 143 and bent plate spring 146. The powder solid lubricant lubricates the respective sliding portions. As a result, the damper mechanism 109 can have an increased lifetime.

The powder solid lubricant filling the damper mechanism 109 requires the following characteristics.

(1) It has a low friction coefficient and provides a good lubricity.

(2) It provide a good adhesive property with respect to each member (metal member).

(3) It can be strongly stuck onto each member after adhering thereto.

Since the powder solid lubricant generally remains on the surfaces of all of the sliding portions, the lubricity can be maintained for a long term.

(4) It is light and is likely to disperse.

(5) It does not have self-condensing properties.

(6) It has a good heat resistance.

(7) It is not an injurious material.

FIG. 24 shows the characteristics of a variety of solid lubricants, all of which may be used in the present invention. However, based on characteristics in FIG. 24, it can be understood that the molybdenum disulfide can be employed most preferably as the solid lubricant in view of good absorptive properties and large adhesive force. Further, the molybdenum disulfide can be used under a high load, and is inexpensive. Tungsten disulfide is second most preferable substance.

The spring accommodating chamber may be filled with fluid such as grease or working fluid. In this case, a viscosity resistance is generated by expansion and shrinkage of a plurality of fluid-filled spaces defined by the bent plate springs 146 in the spring accommodating chamber.

The driven member 143 is a circular member, and integrally has engaging portions 143a which extend radially outward. The engaging portions 143a extend through the spring accommodating chamber, and each are in contact with circumferentially adjacent ends of the paired bent plate springs 146. The first and second input plates 141 and 142 have support portions 141a and 142a which project axially and are in contact with the circumferentially opposite ends of the bent plate springs 146.

The flywheel 102 has the flat friction surface 102a at the transmission side of its outer peripheral portion. The flywheel 102 is also provided with communication apertures 102j which are located radially inside the friction surface 102a and extend between the opposite sides. The driven member 143 is fixed to the radially inner end of the flywheel 102 by the rivets 160. The inner peripheral portions of the flywheel 102 and the driven member 143 are carried by an inner projection 141b of the first input plate 141 through a bearing 661. The flywheel 102 is provided at its outer peripheral surface with circumferentially equally spaced three engaging portions 102k (FIG. 22), which project radially outward. An end of each engaging portion 102k near the engine is inclined to increase a depth as the position moves radially inward.

The clutch cover assembly 103 is basically formed of a clutch cover 621, a pressure plate 122, a diaphragm spring 123, a coupling plate 128, stud pins 126, two wire rings 127 and a conical spring 129.

The clutch cover 621 is a dish-like plate member provided at its center with a large aperture, and is provided at its outer peripheral portion with circumferentially equally spaced three extensions 162 having a predetermined width and extending toward the flywheel 102. Each extension 162 is provided at its end with a bend portion 163 which is bent radially inward. Each bent portion 163 is engaged with the engaging portion 102k of the flywheel 102. Thereby, the clutch cover 621 is unmovable toward the transmission with respect to the flywheel 102. The extension 162 is provided at its end with a circumferentially extending recess with which a circumferentially extending plate 164 is engaged. The plate 164 is fixed to the outer peripheral surface 102b of the flywheel 102 by bolts 165. Owing to the above structure, the clutch cover 621 is unrotatable with respect to the flywheel 102.

The pressure plate 122 is an annular member arranged inside the clutch cover 621. The pressure plate 122 is provided with a pressing surface 122a opposed to the friction surface 102a of the flywheel 102. In the pressure plate 122, there is formed an annular projection 122b projecting toward the transmission and located at the surface opposite to the pressing surface 122a. The pressure plate 122 has a radially inward flange 122c.

The diaphragm spring 123 is a circular member, and is disposed between the clutch cover 621 and the pressure plate 122. The diaphragm spring 123 has an annular elastic portion 123a and a plurality of levers 123b extending radially inward from the portion 123a. There are formed first apertures 123c located between but radially outside the plurality of levers 123b. Correspondingly to the slits, there are formed circumferentially equally spaced three second apertures 123d. The second aperture 123d extends radially inward beyond the first aperture 123c to a position near the flange 122c of the pressure plate 122. The annular elastic portion 123a has a radially inner end, of which opposite sides are carried by the wire rings 127, and also has a radially outer end which in contact with the annular projection 122b of the pressure plate 122. In this state, the elastic portion 123a biases the pressure plate 621 toward the flywheel 102.

A supporting structure 125 for supporting the diaphragm spring 123 will be described below. The plurality of stud pins 126 fixed to the radially inner end of the bottom of the clutch cover 621 extend through the first apertures 123c of the diaphragm spring 123 toward the pressure plate 122. The other end of each stud pin 126 is fixed to the coupling plate 128 which is described below. Radially outside the stud pins 126, the wire rings 127 are arranged between the coupling plate 128 (described below) and the diaphragm spring 123 and between the diaphragm spring 123 and the bottom of the clutch cover 621, respectively. Thus, the radially inner portion of the elastic portion 123a of the diaphragm spring 123 is pinched between the paired wire rings 127.

The coupling plate 128 is annular, and is integrally provided at its inner periphery with three coupling portions 128a, each of which has a long arc-shaped form and circumferentially extends in a direction indicated by R1 in FIG. 21. The end of this coupling portion 128a is fixed to the flange 122c of the pressure plate 122 by a rivet 122c. The rivet 122c is located at a position corresponding to the second aperture 123d of the diaphragm spring 123. The coupling portion 128a has a high rigidity in the circumferential direction but is flexible in the axial direction. The coupling portion 128a biases the pressure plate 122 away from the flywheel 102.

The conical spring 129 is arranged at the radially outer portion of the coupling plate 128. The radially inner end of the conical spring 129 is supported by the coupling plate 128. The radially outer end thereof biases the radially outer end of the diaphragm spring 123, i.e., a portion adjacent to the annular projection 122b of the pressure plate 122 away from the pressure plate 122.

As described above, the coupling plate 128 couples the clutch cover 621 and the pressure plate 122 together, and supports the conical spring 129. Since the coupling plate 128 has multiple functions as described above, the parts can be reduced in number.

The plurality of engaging portions 164 are fixed to the pressure plate 122 by fixing pins 165, and have ends which hold together with the annular projection 122b of the pressure plate 122 the radially outer end of the diaphragm spring 123 located between them. The extension 162 is provided at the position corresponding to each engaging portion 164 with the aperture 621c, as shown in FIG. 22.

The clutch disk assembly 104 is basically formed of the clutch engagement portion 131 similar to that described above with respect to other embodiments, a hub 134 and a plate 166. The clutch engagement portion 131 is disposed between the friction surface 102a of the flywheel 102 and the pressing surface 122a of the pressure plate 122. The hub 134 is spline-engaged with the main drive shaft 106. The plate 166 has an inner peripheral portion fixed to the flange of the hub 134 by rivets 119, and an outer peripheral portion fixed to the clutch coupling portion 131 by rivets 118 (see FIG. 23). The plate 166 is provided with a plurality of circumferentially equally spaced apertures 166a.

The main drive shaft 106 extending from the transmission has an end carried by the crank shaft 105 through a bearing 169. The release device 108 is axially movably arranged around the main drive shaft 106. The release device 108 has an end engaged with the side surfaces, which are opposed to the transmission, of the ends of the levers 123b of the diaphragm spring 123. When the release device 108 moves toward the engine to move the levers 123b toward the engine, the biasing force of the elastic portion 123a against the pressure plate 122 is released.

Although FIG. 22 shows bolts 200, the bolts 200 are not used for actual operation of the modular clutch 601. The bolts 200 are used for attaching and detaching the clutch cover assembly 103 to and from the flywheel 102. The plurality of bolts 200 extend through the apertures formed at the radially inner portion of the bottom of the clutch cover 621, the first apertures 123c of the diaphragm spring 123 and the coupling plate 128, and are screwed into the pressure plate 122, as is described below.

Now, operation of the modular clutch 601 is described.

When the crank shaft 105 of the engine rotates, a torque is transmitted through the flexible plate 107 to the modular clutch 601. The torque is transmitted through the damper mechanism 109 to the flywheel 102, and is output to the clutch disk assembly 104. The pressure plate 122 rotates together with the clutch cover 621 coupled thereto by the coupling plate 128. In this manner, the rotary driving of the pressure plate 122 is performed by the coupling plate 128 coupling the radially inner portions of the pressure plate 122 and the clutch cover 621 together, so that it is not necessary to provide a recess for accommodating a strap plate at the outer peripheral portion of the clutch cover 621, which is required in the prior art.

Since the inertia member 117 is fixed to the first and second input plates 141 and 142, a sufficiently large inertia can be ensured at the input and output systems of a power which is separated from each other by the bent plate springs 146. As a result, the resonant frequency can be lower than the service rotation speed of the engine. Since the inertia member 117 is arranged at the radially outer position, the first and second input plates 141 and 142 which are members defining the spring accommodating chamber can have reduced axial sizes. Consequently, the modular clutch 601 can have a reduced axial size as a whole. Since the inertia member 117 is axially long, the whole structure does not have an increased radial size. As described above, the arrangement of the inertia member 117 at the radially outer position of the damper mechanism 109 does not increase the radial size of the whole apparatus owing to the fact that the clutch attachment seat is eliminated from the flywheel 102 and therefore the inertia member 117 can be arranged at a more radially inner position.

When a bending vibration is transmitted from the crank shaft 105, the flexible plate 107 bends in the bending direction to absorb the vibration.

When the torsional vibration is transmitted from the engine, the damper mechanism 109 allows periodical relative rotation of the first and second input plates 141 and 142 with respect to the driven member 143. In this operation, the bent plate spring 146 is compressed in the circumferential direction, and thereby effectively dampens the torsional vibration.

When a driver depresses a clutch pedal, an end of the release device 108 moves the levers 123b of the diaphragm spring 123 toward the engine. As a result, the radially outer end of the elastic portion 123a is spaced from the annular projection 122b of the pressure plate 122. Thereby, the biasing force by the coupling portion 128a of the coupling plate 128 moves the pressure plate 122 away from the clutch coupling portion 131 of the clutch disk assembly 104. As a result, the torque from the flywheel 102 to the clutch disk assembly 104 is interrupted. In the above releasing operation, the conical spring 129 applies a load directed toward the transmission to the diaphragm spring 123, so that the release load lowers and provides a flat characteristic curve, resulting in reduction in force required for depressing the clutch pedal.

Now, assembly and attachment of the modular clutch 601 is described.

The flywheel 102 and the damper mechanism 109 are fixed together in advance by the rivets 160. In the clutch cover assembly 103, the clutch cover 621 and the pressure plate 122 are axially unmovably fixed together by the bolts 200. The bolts 200 maintain the clutch cover 621 and the pressure plate 122 at adjacent positions in spite of application of the load by the diaphragm spring 123. The clutch cover assembly 103 thus assembled is moved toward the flywheel 102, and the extension 162 of the clutch cover 621 is moved through the space between the engaging portions 102k of the flywheel 102. In this state, the clutch cover 621 is rotated to engage the bent portion 163 with the engaging portion 102k. Then, the bolt 165 and the plate 164 are manipulated through the manipulation aperture 117a for fixing the structure to the flywheel 102, so that the clutch cover 621 is unrotatably fixed to the flywheel 102. The bolts 200 are removed, so that the diaphragm spring 123 biases the pressure plate 122 and the clutch cover 621 axially away from each other. As a result, the bent portion 163 is strongly biased toward the transmission with respect to the engaging portion 102k.

The modular clutch 102 thus completed is fixed by the plurality of bolts 111B to the flexible plate 107 and the inertia member 117 which are already fixed to the crank shaft 105. The bolt 111B extends through a portion of the clutch cover 621 not provided with the extension 162, the portion of the flywheel 102 not provided with the engaging portion 102k and the groove 117b of the inertia member 117, and fixes the outer peripheral portions of the first and second input plates 141 and 142 to the inertia member 117. Owing to the fact that the bolt 111b is fixed from the transmission side in this manner, the workability is improved compared with the prior art.

According to the modular clutch 601, the clutch disk assembly 104 uses the friction facings made of metallic sintered members as already described in the embodiments, it can be used for a longer term. Therefore, it may not be necessary to replace the clutch disk assembly 104. In this case, the lifetime extends until expiration of the lifetime of the flywheel 102 itself. It should be appreciated that the bolt 165 and plate 164 in the present embodiment could be replaced with rivets or welds, as is described above with respect to other embodiments.

Since the clutch disk assembly 104 is provided at the plate 166 with the aperture 166a, and the flywheel 102 is provided with the communication aperture 102j, air flows through these apertures and thereby cools the clutch engagement portion 131. Since the clutch cover 621 is provided with the aperture 621c, and the clutch engagement portion 131 is opened radially outward through portions not provided with the extensions 162. Further, a heat of the clutch engagement portion 131 can be escaped through the manipulation aperture 117a. Owing to these apertures, the clutch engagement portion 131 can be sufficiently cooled. As a result, it is possible to suppress disadvantages such as deformation of the plate 166 due to a heat generated from the clutch engagement portion 131.

For exchanging the clutch disk assembly 104, the clutch cover 621 and the pressure plate 122 are fixed together by the bolts 200 again. Then, the bolts 165 and the plate 164 are removed, and the clutch cover assembly 103 is rotated to disengage the bent portion 163 from the engaging portion 102k. As described above, exchange of the clutch disk assembly 104 simply requires remove of the clutch cover assembly 103 from the flywheel 102, and therefore requires only a simple operation.

NINTH EMBODIMENT

Figure 25:
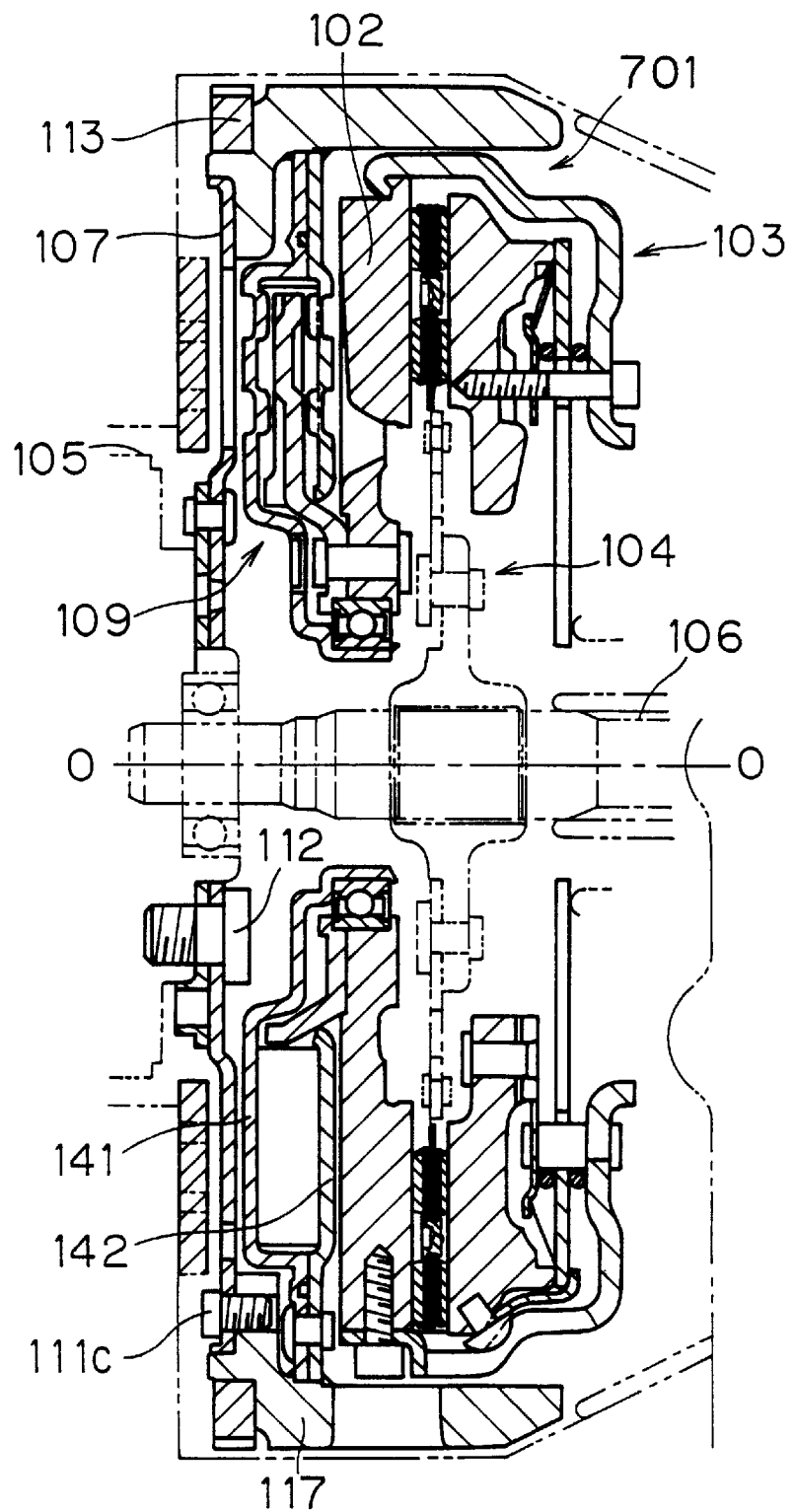
FIG. 25 is a cross section view of a modular clutch in accordance with a ninth embodiment of the present invention.

A modular clutch 701 shown in FIG. 25 has a structure similar to those of the foregoing embodiments. In this modular clutch 701, the inertia member 117 forms a member of the modular clutch 701. More specifically, the outer peripheral portions of the first and second input plates 141 and 142 are welded to the inertia member 117. The modular clutch 701 thus constructed is attached to the flexible plate 107 which is already fixed to the crankshaft 105. More specifically, the radially outer portion of the flexible plate 107 is fixed to the radially inner portion of the inertia member 117 by bolts 111C. The bolts 111C are manipulated from the engine side, and are screwed into the inertia member 117.

According to the modular clutch of the invention, since the clutch disk assembly has the friction facing made of the metallic sintered member, the friction facing can have a significantly increased lifetime, so that there is a large possibility that the modular clutch can be used until expiration of the lifetime of the flywheel. As a result, exchange of the clutch disk assembly may not be required, so that no problem arises even if the clutch cover and the flywheel are unremovably fixed together by a simple structure.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A modular clutch configured as a single module for connection the output of an engine, comprising:

a flywheel formed with a friction surface on one side and configured to be removably attached a torque output member of an engine;

a clutch cover assembly including a clutch cover fixed to said flywheel, a pressure plate disposed inside said clutch cover, said pressure plate having a pressing surface facing said friction surface, said clutch cover assembly further including a biasing member supported in said clutch cover for biasing said pressure plate against said flywheel; and a clutch disk assembly disposed between said friction surface and said pressing surface, said clutch disk assembly having a plurality of friction facings disposed between said friction surface and said pressing surface, said friction facing being formed of a metallic friction material, clutch disk assembly further including at least one cushioning member disposed axially between corresponding pairs of said friction facings.

2. The modular clutch according to claim 1, wherein said clutch cover is caulked to said flywheel.

3. The modular clutch according to claim 1, wherein said clutch cover is welded to said flywheel.

4. The modular clutch according to claim 1, wherein said clutch cover is riveted to said flywheel.

5. The modular clutch according to claim 1, further comprises a ring gear disposed about said clutch cover and said clutch cover encompasses an outer periphery of said flywheel, said ring gear being shrink-fitted about said clutch cover such that said ring gear causes said clutch cover to firmly engage said outer periphery of said flywheel.

6. The modular clutch according to claim 1, wherein said flywheel comprises a first flywheel and an inertia member, and a torsional vibration damper mechanism is disposed between said first flywheel and said inertia member, said torsional vibration damper mechanism allowing limited relative rotation between said first flywheel and said inertia member and further damping vibration therebetween.

7. The modular clutch according to claim 6, wherein said torsional vibration damper mechanism is formed with a chamber having an elastic member disposed therein, and a powder solid lubricant is further disposed within said chamber.

8. The modular clutch according to claim 7, wherein said elastic member is a bent, undulated plate spring.

9. The modular clutch according to claim 8, wherein an outer peripheral portion of said bent plate spring contacts an peripheral wall of said accommodating chamber thereby defining a friction generating mechanism which generates friction therebetween in response to relative rotation between said first flywheel and said inertia member.

10. The modular clutch according to claim 7, wherein said powder solid lubricant is made of molybdenum disulfide.

11. The modular clutch according to claim 7, wherein said powder solid lubricant is made of tungsten disulfide.

12. The modular clutch according to claim 6, wherein said first flywheel and said pressure plate are made of cast iron containing Cr, V and a rare earth element added thereto.

13. The modular clutch according to claim 1, wherein
    said clutch disk assembly further includes a cushioning member capable of elastically deformation in an axial direction, and
    said friction facings are fixed to opposite surfaces of said cushioning member, respectively.

14. The modular clutch according to claim 1, wherein said clutch disk assembly further includes a core plate fixed to a radially outer portion of said clutch disk assembly, one of said friction facings being retained proximate said core plate such that said friction facing may undergo limited movement in an axial direction with respect to said core plate, said cushioning member being retained between said friction facing and said core plate, said cushioning member being deformable in response to movement in the axial direction of said friction facing.

15. The modular clutch according to claim 14, wherein said clutch disk assembly further includes powder material disposed with said cushioning member between said friction facing and said core plate.

16. The modular clutch according to claim 15, wherein said powder material is made of graphite.

17. The modular clutch according to claim 16, wherein said cushioning member has a corrugated form and is a mesh material such that said powder material may flow therethrough.

18. A modular clutch construction comprising:
    a flywheel having an end face configured for connection to a crankshaft of an engine, said end face also having a circumferentially peripheral bulge protruding axially, said axial protrusion increases along a direction of increasing flywheel radius;
    a clutch cover assembly including a clutch cover encompassing said flywheel and axially positioning relative to said flywheel, said clutch cover having a bent rim inwardly bent so as to clamp said peripheral bulge being provided with retaining elements fixed to said end face, said clutch cover being dish-shaped and having a peripheral wall axially extending over said flywheel, said end face having a plurality of circumferentially spaced pedestal portions corresponding to said retaining elements, said retaining elements being formed along said bent rim, each of said retaining elements being bent radially inward flush with a surface of said pedestal portions, said clutch cover assembly further including a pressure plate coaxial with said flywheel and facing an opposite end face of said flywheel;
    a clutch disk assembly coaxial with said pressure plate and said flywheel and disposed therebetween, friction portions of said clutch disk assembly being formed of a sintered metal material;
    fasteners for fixing said clutch cover retaining elements to said pedestal portions; and
    a portion of said clutch cover peripheral wall is stepped radially inward, forming an abutment which abuts marginally against said opposite end face of said flywheel.

19. The modular clutch according to claim 18, wherein said flywheel and said pressure plate are made of cast iron containing Cr, V and a rare earth element added thereto.

20. The modular clutch according to claim 18, wherein said clutch disk assembly further includes:
    a core plate fixed to a radially outer portion of said clutch disk assembly, one of said friction facings being retained proximate said core plate such that said friction facing may undergo limited movement in an axial direction with respect to said core plate;
    a cushioning member retained between said friction facing and said core plate, said cushioning member being deformable in response to movement in the axial direction of said friction facing.

21. The modular clutch according to claim 20, wherein said clutch disk assembly further includes powder material disposed with said cushioning member between said friction facing and said core plate.

22. The modular clutch according to claim 21, wherein said powder material is made of graphite.

23. The modular clutch according to claim 22, wherein said cushioning member has a corrugated form and is a mesh material such that said powder material may flow therethrough.

24. A modular clutch construction comprising:
    a flywheel having an annular portion formed with an outer radial surface, a first axial face is connectable to a corresponding member of an engine for power input to the clutch, said first axial face having a peripheral bulge extending axially, and a second axial face opposite said first axial face;
    a clutch cover assembly, including
    (a) an annular pressure plate having an outer radial surface, coaxially disposed adjacent to said flywheel and facing said second axial face;
    (b) an urging member attached to said pressure plate for elastically urging said pressure plate toward said flywheel;
    (c) a unitary clutch cover including an annular wall encompassing said outer radial surfaces of said pressure plate and said flywheel, a caulking portion extending from said annular wall to be caulked to said peripheral bulge, a fixation portion extending from said annular wall to be fixed to said second axial face, and a support portion for supporting said urging member;

a clutch disc assembly coaxially disposed between said pressure plate and said flywheel, friction portions of said clutch disk assembly being formed of a sintered metal material.

25. The modular clutch according to claim 24, wherein said flywheel and said annular pressure plate are made of cast iron containing Cr, V and a rare earth element added thereto.

26. A modular clutch construction according to claim 24, wherein said peripheral bulge has an arcuate shape, and said caulking portion has an arcuate shape corresponding to said peripheral bulge.

27. A modular clutch construction according to claim 26, wherein said peripheral bulge extends outwardly in an axial direction adjacent to a peripheral edge of said flywheel.

28. A modular clutch construction according to claim 26, wherein said annular wall has a second caulking portion caulked to a peripheral edge of said second axial face of said flywheel, said flywheel being axially sandwiched between said caulking portion and said second caulking portion.

29. A modular clutch construction according to claim 28, wherein said second caulking portion of said clutch cover is stepped radially inward and abuts against said second axial face of said flywheel.

30. A modular clutch construction according to claim 24, wherein said peripheral bulge extends outwardly in an axial direction adjacent to an outer radial edge of said flywheel.

31. A modular clutch construction according to claim 30, wherein said annular wall has a second caulking portion caulked to a peripheral edge of said second axial face of said flywheel, said flywheel being axially sandwiched between said caulking portion and said second caulking portion.

32. A modular clutch construction according to claim 21, wherein said second caulking portion of said clutch cover is stepped radially inward and abuts against said second axial face of said flywheel.

33. A modular clutch construction according to claim 24, wherein said annular wall has a second caulking portion caulked to a peripheral edge of said second axial face of said flywheel, said flywheel being axially sandwiched between said caulking portion and said second caulking portion.

34. A modular clutch construction according to claim 33, wherein said second caulking portion of said clutch cover is stepped radially inward and abuts against said second end face of said flywheel.

35. The modular clutch according to claim 24, wherein said clutch disk assembly further includes:

a core plate fixed to a radially outer portion of said clutch disk assembly, one of said friction facings being retained proximate said core plate such that said friction facing may undergo limited movement in an axial direction with respect to said core plate; and a cushioning member retained between said friction facing and said core plate, said cushioning member being deformable in response to movement in the axial direction of said friction facing.

36. The modular clutch according to claim 35, wherein said clutch disk assembly further includes powder material disposed with said cushioning member between said friction facing and said core plate.

37. The modular clutch according to claim 36, wherein said powder material is made of graphite.

38. The modular clutch according to claim 37, wherein said cushioning member has a corrugated form and is a mesh material such that said powder material may flow therethrough.

* * * * *